US012213224B2

(12) United States Patent
Miskin et al.

(10) Patent No.: US 12,213,224 B2
(45) Date of Patent: Jan. 28, 2025

(54) MULTI-VOLTAGE AND MULTI-BRIGHTNESS LED LIGHTING DEVICES AND METHODS OF USING SAME

(71) Applicant: Lynk Labs, Inc., Elgin, IL (US)

(72) Inventors: Michael Miskin, Sleepy Hollow, IL (US); Robert L. Kottritsch, Shefford (GB)

(73) Assignee: Lynk Labs, Inc., Elgin, IL (US)

(*) Notice: Subject to any disclaimer, the term of this patent is extended or adjusted under 35 U.S.C. 154(b) by 0 days.

(21) Appl. No.: 17/712,658

(22) Filed: Apr. 4, 2022

(65) Prior Publication Data

US 2022/0232683 A1 Jul. 21, 2022

Related U.S. Application Data

(63) Continuation of application No. 17/181,802, filed on Feb. 22, 2021, now Pat. No. 11,297,705, which is a (Continued)

(51) Int. Cl.

*H05B 45/40* (2020.01)
*H05B 45/00* (2022.01)
*H05B 45/42* (2020.01)

(52) U.S. Cl.

CPC ............. *H05B 45/40* (2020.01); *H05B 45/00* (2020.01); *H05B 45/42* (2020.01); *Y10T 29/49002* (2015.01)

(58) Field of Classification Search

None

See application file for complete search history.

(56) References Cited

U.S. PATENT DOCUMENTS 3,582,932 A 6/1971 Chapman
3,712,706 A 1/1973 Stamm
(Continued)

FOREIGN PATENT DOCUMENTS

AU 2003100206 4/2003
CN 1341966 A 3/2002
(Continued)

OTHER PUBLICATIONS

Petition for Inter Partes Review, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 95 pages dated Aug. 18, 2021.
(Continued)

*Primary Examiner* — Crystal L Hammond
(74) *Attorney, Agent, or Firm* — K&L Gates LLP

(57) ABSTRACT

An LED lighting device is disclosed. The example LED lighting device includes a first LED circuit having at least two phosphor coated LEDs connected in series and at least one additional LED circuit having at least two phosphor coated LEDs connected in series. The LED lighting device also includes a switch having user selectable positions for providing user control to select DC voltage level options to change a DC voltage level that is delivered to at least one of the first LED circuit or the at least one additional LED circuit. One user selectable position decreases a brightness level individually of the first LED circuit and the at least one additional LED circuit. Another user selectable position individually disconnects the first LED circuit and the at least one additional LED circuit from a mains power source.

30 Claims, 8 Drawing Sheets

Related U.S. Application Data continuation of application No. 16/740,295, filed on Jan. 10, 2020, now Pat. No. 10,932,341, which is a continuation of application No. 16/274,164, filed on Feb. 12, 2019, now Pat. No. 10,537,001, which is a continuation of application No. 15/685,429, filed on Aug. 24, 2017, now Pat. No. 10,271,393, which is a continuation of application No. 14/172,644, filed on Feb. 4, 2014, now Pat. No. 9,750,098, which is a continuation of application No. 13/322,796, filed as application No. PCT/US2010/001597 on May 28, 2010, now Pat. No. 8,648,539, which is a continuation-in-part of application No. 12/287,267, filed on Oct. 6, 2008, now Pat. No. 8,179,055.

(60) Provisional application No. 61/217,215, filed on May 28, 2009, provisional application No. 60/997,771, filed on Oct. 6, 2007.

(56) References Cited

U.S. PATENT DOCUMENTS 3,821,662 A 6/1974 Dewinter et al.
3,869,641 A 3/1975 Goldberg
3,981,023 A 9/1976 King et al.
4,104,562 A 8/1978 DiCola
4,145,655 A 3/1979 Caudel et al.
4,170,018 A 10/1979 Runge
4,218,627 A 8/1980 Kiesel
4,246,533 A 1/1981 Chiang
4,271,408 A 5/1981 Teshima et al.
4,298,869 A 11/1981 Okuno
4,350,973 A 9/1982 Petryk, Jr.
4,530,973 A 7/1985 Koster
4,563,592 A 1/1986 Yuhasz et al.
4,573,766 A 3/1986 Bournay, Jr. et al.
4,653,895 A 3/1987 Deguchi et al.
4,654,880 A 3/1987 Sontag
4,646,398 A 4/1987 Michael et al.
4,656,398 A 4/1987 Michael et al.
4,691,341 A 9/1987 Knoble et al.
4,780,621 A 10/1988 Bartleucci et al.
4,797,651 A 1/1989 Havel
4,816,698 A 3/1989 Hook
RE33,285 E 7/1990 Kunen
4,962,347 A 10/1990 Burroughs et al.
5,010,459 A 4/1991 Taylor et al.
5,014,052 A 5/1991 Obeck
5,028,859 A 7/1991 Johnson et al.
5,086,294 A 2/1992 Kasegi
5,267,134 A 11/1993 Banayan
5,293,494 A 3/1994 Saito et al.
5,324,316 A 6/1994 Schulman et al.
5,353,213 A 10/1994 Paulik et al.
5,408,330 A 4/1995 Squicciarini et al.
5,430,609 A 7/1995 Kikinis
5,457,450 A 10/1995 Deese et al.
5,463,280 A 10/1995 Johnson
5,469,020 A 11/1995 Herrick
5,519,263 A 5/1996 Santana, Jr.
5,521,652 A 5/1996 Shalvi
5,532,641 A 7/1996 Balasubramanian et al.
5,550,066 A 8/1996 Tang et al.
5,562,240 A 10/1996 Campbell
5,596,567 A 1/1997 DeMuro et al.
5,621,225 A 4/1997 Shieh et al.
5,636,303 A 6/1997 Che et al.
5,652,609 A 7/1997 Scholler et al.
5,657,054 A 8/1997 Files et al.
5,661,645 A 8/1997 Hochstein
5,663,719 A 9/1997 Deese et al.
5,684,738 A 11/1997 Au et al.
5,699,218 A 12/1997 Kadah
5,728,432 A 3/1998 Imashiro et al.
5,739,639 A 4/1998 Johnson
5,785,418 A 7/1998 Hochstein
5,790,013 A 8/1998 Hauck
5,790,106 A 8/1998 Hirano et al.
5,803,579 A 9/1998 Turnbull et al.
5,806,965 A 9/1998 Deese
5,828,768 A 10/1998 Eatwell et al.
5,847,507 A 12/1998 Butterworth et al.
5,874,803 A 2/1999 Garbuzov et al.
5,923,239 A 7/1999 Krueger et al.
5,936,599 A 8/1999 Reymond
5,946,348 A 8/1999 Mizutani et al.
5,963,012 A 10/1999 Garcia et al.
5,965,907 A 10/1999 Huang et al.
5,973,677 A 10/1999 Gibbons
5,982,103 A 11/1999 Mosebrook et al.
5,998,925 A 12/1999 Shimizu et al.
6,016,038 A * 1/2000 Mueller ................. H05B 47/10
315/312
6,019,493 A 2/2000 Kuo et al.
6,023,073 A 2/2000 Strite
6,028,694 A 2/2000 Schmidt
6,061,259 A 5/2000 DeMichele
6,072,280 A 6/2000 Allen
6,072,475 A 6/2000 van Ketwich
6,078,148 A 6/2000 Hochstein
6,107,744 A 8/2000 Bavaro et al.
6,127,783 A 10/2000 Pashley et al.
6,164,368 A 12/2000 Furukawa et al.
6,184,628 B1 2/2001 Ruthenberg
6,211,626 B1 4/2001 Lys et al.
6,227,679 B1 5/2001 Zhang et al.
6,234,648 B1 5/2001 Bomer
6,246,169 B1 6/2001 Pruvot
6,246,862 B1 6/2001 Grivas et al.
6,265,984 B1 7/2001 Molinaroli
6,292,901 B1 9/2001 Lys et al.
6,300,725 B1 10/2001 Zinkler et al.
6,300,748 B1 10/2001 Miller
6,303,238 B1 10/2001 Thompson et al.
6,307,757 B1 10/2001 Porter et al.
6,319,778 B1 11/2001 Chen et al.
6,323,652 B1 11/2001 Collier et al.
6,324,082 B1 11/2001 Keller
6,329,694 B1 12/2001 Lee et al.
6,357,889 B1 3/2002 Duggal et al.
6,361,886 B2 3/2002 Shi et al.
6,362,789 B1 3/2002 Trumbull et al.
6,380,693 B1 4/2002 Kastl
6,396,001 B1 5/2002 Nakamura
6,396,801 B1 5/2002 Upton et al.
6,404,131 B1 6/2002 Kawano et al.
6,411,045 B1 6/2002 Nerone
6,412,971 B1 7/2002 Wojnarowski et al.
6,439,731 B1 8/2002 Johnson et al.
6,441,558 B1 8/2002 Muthu et al.
6,456,481 B1 9/2002 Stevenson
6,466,198 B1 10/2002 Feinstein
6,489,724 B1 12/2002 Smith et al.
6,489,754 B2 12/2002 Blom
6,501,100 B1 12/2002 Srivastava et al.
6,507,159 B2 1/2003 Muthu
6,510,995 B2 1/2003 Muthu et al.
6,528,954 B1 3/2003 Lys et al.
6,529,126 B1 3/2003 Henry
6,541,800 B2 4/2003 Barnett et al.
6,541,919 B1 4/2003 Roach et al.
6,548,967 B1 4/2003 Dowling et al.
6,559,802 B2 5/2003 Goto et al.
6,577,072 B2 6/2003 Saito et al.
6,580,228 B1 6/2003 Chen et al.
6,600,243 B1 7/2003 Hara et al.
6,614,103 B1 9/2003 Durocher et al.
6,618,042 B1 9/2003 Powell
6,633,120 B2 10/2003 Salam
6,636,003 B2 10/2003 Rahm et al.
6,636,005 B2 10/2003 Wacyk et al.
6,643,336 B1 11/2003 Hsieh
6,663,246 B2 12/2003 Currens et al.

(56) References Cited

U.S. PATENT DOCUMENTS 6,664,744 B2 12/2003 Dietz
6,686,697 B2 2/2004 Cho et al.
6,689,626 B2 2/2004 Krijin et al.
6,714,348 B2 3/2004 Dunn
6,717,353 B1 4/2004 Mueller et al.
6,722,771 B1 4/2004 Stephens
6,774,582 B1 8/2004 Kwong et al.
6,781,329 B2 8/2004 Mueller et al.
6,781,570 B1 8/2004 Arrigo et al.
6,803,732 B2 10/2004 Kraus et al.
6,814,642 B2 11/2004 Siwinski et al.
6,832,729 B1 12/2004 Perry et al.
6,844,675 B2 1/2005 Yang
6,850,169 B2 2/2005 Manavi et al.
6,856,103 B1 2/2005 Hudson et al.
6,861,658 B2 3/2005 Fiset
6,879,319 B2 4/2005 Cok
6,879,497 B2 4/2005 Hua et al.
6,882,128 B1 4/2005 Rahmel et al.
6,891,786 B2 5/2005 Sato
6,907,089 B2 6/2005 Jensen et al.
6,936,936 B2 8/2005 Fischer et al.
6,949,772 B2 9/2005 Shimizu et al.
6,965,205 B2 11/2005 Piepgras et al.
6,988,053 B2 1/2006 Namaky
7,019,662 B2 3/2006 Shackle
7,038,399 B2 5/2006 Lys et al.
7,044,627 B2 5/2006 Mertz et al.
7,053,560 B1 5/2006 Ng
7,081,722 B1 7/2006 Huynh et al.
7,161,590 B2 1/2007 Daniels
7,176,885 B2 2/2007 Troxell et al.
7,180,265 B2 2/2007 Naskali et al.
7,202,613 B2 4/2007 Morgan et al.
7,213,940 B1 5/2007 Van De Ven et al.
7,226,442 B2 6/2007 Sheppard, Jr. et al.
7,226,644 B2 6/2007 Sheppard, Jr. et al.
7,258,463 B2 8/2007 Sloan et al.
7,262,559 B2 8/2007 Tripathi et al.
7,264,378 B2 9/2007 Loh
7,271,568 B2 9/2007 Purdy et al.
7,288,902 B1 10/2007 Melanson
7,344,279 B2 3/2008 Mueller et al.
7,348,957 B2 3/2008 Cui et al.
7,375,476 B2 5/2008 Scott et al.
7,419,281 B2 9/2008 Porchia et al.
7,489,086 B2 2/2009 Miskin et al.
7,583,901 B2 9/2009 Nakagawa et al.
7,748,877 B1 * 7/2010 Colby .................... H05B 45/00
315/59
7,852,009 B2 12/2010 Coleman et al.
7,859,196 B2 12/2010 Lee et al.
RE42,161 E 2/2011 Hochstein
7,888,882 B2 2/2011 Huang et al.
7,961,113 B2 6/2011 Rabiner et al.
8,055,310 B2 11/2011 Beart et al.
8,080,819 B2 12/2011 Mueller et al.
8,129,917 B2 3/2012 Kim et al.
8,148,905 B2 4/2012 Miskin et al.
8,179,055 B2 5/2012 Miskin et al.
8,198,819 B2 6/2012 Lenk
8,203,275 B2 6/2012 Ruxton
8,272,757 B1 9/2012 Fan et al.
8,314,571 B2 11/2012 Jonsson
8,326,225 B2 12/2012 Oba et al.
8,362,695 B2 1/2013 Aanegola et al.
8,373,363 B2 2/2013 Zdenko
8,400,081 B2 3/2013 Catalano et al.
8,471,495 B2 6/2013 Muguruma et al.
8,587,205 B2 11/2013 Ter Weeme et al.
9,112,957 B2 9/2015 Beart et al.
9,198,237 B2 11/2015 Miskin
9,615,420 B2 4/2017 Miskin
9,807,827 B2 10/2017 Miskin et al.
10,091,842 B2 10/2018 Miskin et al.
10,154,551 B2 12/2018 Miskin et al.
10,178,715 B2 1/2019 Miskin et al.
10,349,479 B2 7/2019 Miskin et al.
10,492,251 B2 11/2019 Miskin et al.
10,492,252 B2 11/2019 Miskin et al.
10,499,466 B1 12/2019 Miskin et al.
10,506,674 B2 12/2019 Miskin et al.
10,517,149 B2 12/2019 Miskin et al.
10,537,001 B2 1/2020 Miskin et al.
10,575,376 B2 2/2020 Miskin et al.
10,687,400 B2 6/2020 Miskin et al.
10,750,583 B2 8/2020 Miskin et al.
10,757,783 B2 8/2020 Miskin et al.
10,932,341 B2 2/2021 Miskin et al.
10,966,298 B2 3/2021 Miskin et al.
11,019,697 B2 5/2021 Miskin et al.
2001/0005319 A1 6/2001 Ohishi et al.
2001/0054005 A1 12/2001 Hook et al.
2002/0014630 A1 2/2002 Okazaki et al.
2002/0021573 A1 2/2002 Zhang
2002/0030193 A1 3/2002 Yamazaki et al.
2002/0030194 A1 3/2002 Camras et al.
2002/0048169 A1 * 4/2002 Dowling ................. F21K 9/233
372/38.1
2002/0048177 A1 4/2002 Rahm et al.
2002/0060530 A1 5/2002 Sembhi et al.
2002/0070914 A1 * 6/2002 Bruning ............... G09G 3/3413
345/102
2002/0072395 A1 6/2002 Miramontes
2002/0080010 A1 6/2002 Zhang
2002/0080663 A1 6/2002 Kameyama et al.
2002/0081982 A1 6/2002 Schwartz et al.
2002/0086702 A1 7/2002 Lai et al.
2002/0113244 A1 8/2002 Barnett et al.
2002/0113246 A1 8/2002 Nagai et al.
2002/0118557 A1 8/2002 Ohlsson
2002/0130627 A1 9/2002 Morgan
2002/0137258 A1 9/2002 Akram et al.
2002/0145392 A1 10/2002 Hair et al.
2002/0149572 A1 10/2002 Schulz et al.
2002/0158590 A1 10/2002 Saito et al.
2002/0163006 A1 11/2002 Sundar et al.
2002/0167016 A1 11/2002 Hoelen et al.
2002/0175870 A1 11/2002 Gleener
2002/0176259 A1 11/2002 Ducharme
2002/0181231 A1 12/2002 Luk
2002/0187675 A1 12/2002 McMullin et al.
2002/0191029 A1 12/2002 Gillespie et al.
2002/0195968 A1 12/2002 Sanford et al.
2003/0001657 A1 1/2003 Worley
2003/0011972 A1 1/2003 Koo
2003/0015968 A1 1/2003 Allen
2003/0020629 A1 1/2003 Swartz et al.
2003/0035075 A1 2/2003 Butler et al.
2003/0038291 A1 2/2003 Cao
2003/0043611 A1 3/2003 Bockle et al.
2003/0063462 A1 4/2003 Shimuzu et al.
2003/0072145 A1 4/2003 Nolan et al.
2003/0076306 A1 4/2003 Zadesky et al.
2003/0085621 A1 5/2003 Potega
2003/0085870 A1 5/2003 Hinckley
2003/0102810 A1 6/2003 Cross et al.
2003/0100837 A1 7/2003 Piepgras et al.
2003/0122502 A1 7/2003 Clauberg et al.
2003/0137258 A1 7/2003 Piepgras et al.
2003/0144034 A1 7/2003 Hack et al.
2003/0146897 A1 8/2003 Hunter
2003/0156422 A1 8/2003 Tatewaki et al.
2003/0169014 A1 9/2003 Kadah
2003/0175004 A1 9/2003 Garito et al.
2003/0185005 A1 10/2003 Sommers et al.
2003/0219035 A1 11/2003 Schmidt
2003/0230934 A1 12/2003 Cordelli et al.
2003/0231168 A1 12/2003 Bell et al.
2003/0234621 A1 12/2003 Kriparos
2004/0022058 A1 2/2004 Birrell
2004/0041620 A1 3/2004 D'Angelo et al.
2004/0075399 A1 4/2004 Hall
2004/0080941 A1 4/2004 Jiang et al.

(56) References Cited

U.S. PATENT DOCUMENTS

| | | | |
|---|---|---|---|
| 2004/0108997 A1 | 6/2004 | Lee | |
| 2004/0130909 A1 | 7/2004 | Mueller et al. | |
| 2004/0150994 A1 | 8/2004 | Kazar et al. | |
| 2004/0164948 A1* | 8/2004 | Kabel | G09G 3/3406 345/102 |
| 2004/0183380 A1 | 9/2004 | Otake | |
| 2004/0189218 A1 | 9/2004 | Leong et al. | |
| 2004/0201988 A1* | 10/2004 | Allen | H05B 45/42 362/227 |
| 2004/0206970 A1 | 10/2004 | Martin | |
| 2004/0207484 A1 | 10/2004 | Forrester et al. | |
| 2004/0212321 A1 | 10/2004 | Lys et al. | |
| 2004/0218387 A1 | 11/2004 | Gerlach | |
| 2004/0263084 A1 | 12/2004 | Mor et al. | |
| 2004/0264193 A1 | 12/2004 | Okumura | |
| 2004/0266349 A1 | 12/2004 | Wang | |
| 2005/0001225 A1 | 1/2005 | Yoshimura et al. | |
| 2005/0040773 A1 | 2/2005 | Lebens et al. | |
| 2005/0058852 A1 | 3/2005 | Tyan et al. | |
| 2005/0078093 A1 | 4/2005 | Peterson, Jr. et al. | |
| 2005/0110426 A1 | 5/2005 | Shao | |
| 2005/0111234 A1 | 5/2005 | Martin et al. | |
| 2005/0116235 A1 | 6/2005 | Schultz et al. | |
| 2005/0128751 A1 | 6/2005 | Roberge et al. | |
| 2005/0158590 A1 | 7/2005 | Li et al. | |
| 2005/0168156 A1 | 8/2005 | Li et al. | |
| 2005/0173990 A1 | 8/2005 | Andersen et al. | |
| 2005/0185401 A1 | 8/2005 | Jiang et al. | |
| 2005/0195600 A1 | 9/2005 | Porchia et al. | |
| 2005/0231133 A1 | 10/2005 | Lys | |
| 2005/0276053 A1 | 12/2005 | Nortrup et al. | |
| 2006/0038542 A1 | 2/2006 | Park et al. | |
| 2006/0091415 A1 | 5/2006 | Yan | |
| 2006/0099994 A1 | 5/2006 | Yang et al. | |
| 2006/0103913 A1 | 5/2006 | Handschy et al. | |
| 2006/0138971 A1 | 6/2006 | Uang et al. | |
| 2006/0158130 A1 | 7/2006 | Furukawa | |
| 2006/0163589 A1 | 7/2006 | Fan et al. | |
| 2006/0176692 A1 | 8/2006 | Lee et al. | |
| 2006/0238136 A1 | 10/2006 | Johnson, III et al. | |
| 2006/0256826 A1 | 11/2006 | Lin et al. | |
| 2007/0024213 A1 | 2/2007 | Shtenyberg et al. | |
| 2007/0069663 A1 | 3/2007 | Burdalski et al. | |
| 2007/0115248 A1 | 5/2007 | Roberts et al. | |
| 2007/0139717 A1 | 6/2007 | Kuo et al. | |
| 2007/0171145 A1 | 7/2007 | Coleman et al. | |
| 2007/0258231 A1 | 11/2007 | Koemer et al. | |
| 2007/0273299 A1 | 11/2007 | Miskin et al. | |
| 2007/0290625 A1 | 12/2007 | He | |
| 2008/0094005 A1 | 4/2008 | Rabiner et al. | |
| 2008/0094837 A1 | 4/2008 | Dobbins et al. | |
| 2008/0116816 A1 | 5/2008 | Neuman et al. | |
| 2008/0116818 A1 | 5/2008 | Shteynberg et al. | |
| 2008/0130288 A1 | 6/2008 | Catalano et al. | |
| 2008/0136347 A1 | 6/2008 | Lin et al. | |
| 2008/0158915 A1 | 7/2008 | Williams | |
| 2008/0203405 A1 | 8/2008 | Rooymans | |
| 2008/0203936 A1 | 8/2008 | Mariyama et al. | |
| 2008/0211421 A1 | 9/2008 | Lee et al. | |
| 2008/0218098 A1 | 9/2008 | Lee et al. | |
| 2008/0218995 A1 | 9/2008 | Gilkey | |
| 2008/0252197 A1 | 10/2008 | Li et al. | |
| 2009/0009100 A1 | 1/2009 | Rooymans | |
| 2009/0017433 A1 | 1/2009 | Belsky et al. | |
| 2009/0021185 A1 | 1/2009 | Ng | |
| 2009/0079362 A1 | 3/2009 | Shteynberg et al. | |
| 2009/0134413 A1* | 5/2009 | Roth | H05B 45/40 257/E31.095 |
| 2009/0160358 A1 | 6/2009 | Slava | |
| 2009/0167190 A1 | 7/2009 | Hickey | |
| 2009/0167202 A1 | 7/2009 | Miskin et al. | |
| 2009/0174337 A1 | 7/2009 | Miskin et al. | |
| 2009/0295300 A1 | 12/2009 | King | |
| 2010/0039794 A1 | 2/2010 | Ghanem et al. | |
| 2010/0072280 A1 | 3/2010 | McGill et al. | |
| 2010/0072905 A1 | 3/2010 | Kim et al. | |
| 2010/0109564 A1 | 5/2010 | Shin et al. | |
| 2010/0134038 A1 | 6/2010 | Shackle | |
| 2010/0141177 A1 | 6/2010 | George | |
| 2010/0259183 A1 | 10/2010 | Leshniak | |
| 2010/0277084 A1* | 11/2010 | Lee | H05B 33/02 315/192 |
| 2010/0308738 A1 | 12/2010 | Shteynberg et al. | |
| 2011/0115407 A1 | 5/2011 | Wibben et al. | |
| 2011/0148327 A1 | 6/2011 | Van de Ven et al. | |
| 2011/0169408 A1 | 7/2011 | Chen et al. | |
| 2011/0193484 A1 | 8/2011 | Harbers et al. | |
| 2011/0260648 A1 | 10/2011 | Hamamoto et al. | |
| 2011/0273098 A1 | 11/2011 | Grajcar | |
| 2012/0043897 A1 | 2/2012 | Miskin et al. | |
| 2012/0069560 A1 | 3/2012 | Miskin et al. | |
| 2012/0081009 A1 | 4/2012 | Shteynberg et al. | |
| 2012/0206050 A1 | 8/2012 | Spero | |
| 2012/0293083 A1 | 11/2012 | Miskin et al. | |
| 2013/0051001 A1 | 2/2013 | Miskin | |
| 2014/0153232 A1 | 6/2014 | Miskin et al. | |
| 2014/0361697 A1 | 12/2014 | Miskin et al. | |
| 2016/0095180 A1 | 3/2016 | Miskin | |
| 2016/0143097 A1 | 5/2016 | Miskin | |
| 2016/0188426 A1 | 6/2016 | Kousha | |
| 2017/0354005 A1 | 12/2017 | Miskin et al. | |
| 2019/0045593 A1 | 2/2019 | Miskin et al. | |
| 2019/0182919 A1 | 6/2019 | Miskin et al. | |
| 2019/0268982 A1 | 8/2019 | Miskin et al. | |
| 2019/0306940 A1 | 10/2019 | Miskin et al. | |
| 2019/0313491 A1 | 10/2019 | Miskin et al. | |
| 2019/0350053 A1 | 11/2019 | Miskin et al. | |
| 2022/0226795 A1 | 7/2022 | Jonsson et al. | |

FOREIGN PATENT DOCUMENTS

| | | | |
|---|---|---|---|
| EP | 0515664 | | 12/1992 |
| EP | 1160883 | | 12/2001 |
| EP | 1215944 | | 6/2002 |
| EP | 1502483 | | 2/2005 |
| EP | 1953825 | | 8/2008 |
| EP | 1953825 | B1 | 7/2013 |
| GB | 2202414 | | 9/1988 |
| GB | 2202414 | A | 9/1988 |
| GB | 2264555 | | 9/1993 |
| GB | 2372609 | | 8/2002 |
| IL | 123123 | | 3/2004 |
| JP | S6230386 | | 2/1987 |
| JP | 08137429 | | 5/1996 |
| JP | H08149063 | | 6/1996 |
| JP | 11-330561 | | 11/1999 |
| JP | 2000030877 | | 1/2000 |
| JP | 200050512 | | 2/2000 |
| JP | 2000156526 | | 6/2000 |
| JP | 2000278383 | A | 10/2000 |
| JP | 2001004753 | A | 1/2001 |
| JP | 2001176677 | | 6/2001 |
| JP | 2001284065 | | 12/2001 |
| JP | 2002050798 | A | 2/2002 |
| JP | 2002057376 | | 2/2002 |
| JP | 2002208301 | A | 7/2002 |
| JP | 2003047177 | A | 2/2003 |
| JP | 2001291406 | | 4/2003 |
| JP | 2003298118 | | 10/2003 |
| JP | 2004111104 | | 4/2004 |
| JP | 2005-524960 | | 8/2005 |
| JP | 2005222750 | | 8/2005 |
| JP | 2007059260 | | 3/2007 |
| JP | 3162876 | | 9/2010 |
| JP | 2011-040701 | | 2/2011 |
| JP | 2011159495 | | 8/2011 |
| KR | 100367215 | B1 | 1/2003 |
| KR | 20030073747 | A | 9/2003 |
| WO | 9750168 | | 12/1997 |
| WO | 1997050168 | | 12/1997 |
| WO | 9922338 | | 5/1999 |
| WO | 9939319 | | 8/1999 |
| WO | 0101385 | | 1/2001 |
| WO | 2001001385 | | 1/2001 |

(56) References Cited

FOREIGN PATENT DOCUMENTS

| | | | |
|---|---|---|---|
| WO | 0215320 | | 2/2002 |
| WO | 0221741 | A1 | 3/2002 |
| WO | 2002023956 | | 3/2002 |
| WO | WO02/23956 | | 3/2002 |
| WO | 0231406 | | 4/2002 |
| WO | 02062623 | | 8/2002 |
| WO | 03009535 | A1 | 1/2003 |
| WO | 03/026358 | | 3/2003 |
| WO | 2003019072 | | 3/2003 |
| WO | 03055273 | | 7/2003 |
| WO | 03/075126 | | 9/2003 |
| WO | 2004055654 | A2 | 7/2004 |
| WO | 2004094896 | | 11/2004 |
| WO | 2009045548 | | 4/2005 |
| WO | 2005084080 | | 9/2005 |
| WO | 2006023149 | | 3/2006 |
| WO | 2007001116 | | 1/2007 |
| WO | 2008062941 | | 5/2008 |
| WO | 2008124701 | | 10/2008 |
| WO | 2010016002 | | 2/2010 |
| WO | 2010035155 | | 4/2010 |
| WO | 2010103480 | | 9/2010 |
| WO | 2010126601 | | 11/2010 |
| WO | 20101266011 | | 11/2010 |
| WO | 20100138211 | | 12/2010 |
| WO | 2011049613 | | 4/2011 |
| WO | 2011082168 | | 11/2011 |
| WO | 2011143510 | | 11/2011 |
| WO | 20110143510 | | 11/2011 |
| WO | 2013026053 | | 2/2013 |
| WO | 2013082609 | | 6/2013 |
| WO | 2010138211 | | 12/2020 |

OTHER PUBLICATIONS

Petitioners' Power of Attorney, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 2 pages dated Aug. 17, 2021.

Declaration of Dr. Lebby U.S. Pat. No. 10,757,783 dated Aug. 18, 2021, 187 pages—Ex 1002.

U.S. Appl. No. 16/440,884, filed Jun. 13, 2019, 341 pages—Ex 1003.

Institute of Transportation Engineers, Publication No. ST-017B 300/IG/102, ISBN 0-935403-16-7 (1998), 25 pages—Ex 1007.

Complaint for Patent Infringement *Lynk Labs, Inc.* v. *Home Depot USA Inc., The Home Depot Inc., and Home Depot Product Authority*, LLC, Case No. 6:21-cv-00097, filed Jan. 29, 2021, 86 pages—Ex. 1010.

U.S. Appl. No. 61/630,025, filed Dec. 2, 2011, 39 pages—Ex 1012.

U.S. Appl. No. 61/570,200, filed Dec. 13, 2011, 51 pages—Ex 1013.

Plaintiff Lynk Labs, Inc.'s Amended Preliminary Infringement Contentions, Case No. 6:21-cv-00097-ADA, dated Jun. 23, 2021, 7 pages—Ex 1019.

Okon et al., "The First Practical LED", Received: Nov. 9, 2015, 14 pages—Ex 1020.

Scheduling Order, Case No. 6:21-cv-00097-ADA filed Aug. 13, 2021, 4 pages—Ex 1021.

U.S. Appl. No. 61/233,829, filed Aug. 14, 2009, 36 pages—Ex 1022.

*Home Depot U.S.A., Inc.* v. *Lynk Labs, Inc.* Case IPR 2022-00023 U.S. Pat. No. 10,517,149, Issue Date Dec. 24, 2019, Declaration of Dr. Lebby dated Oct. 20, 2021, 157 pages—Ex. 1002.

*Lynk Labs, Inc.*, v. *Home Depot USA, Inc., The Home Dept Inc., and Home Depot Product Authority, LLC* Case No. 6:21-cv-00097-ADA Scheduling Order filed Aug. 13, 2021, 4 pages—Ex. 1003.

*Lynk Labs, Inc.*, v. *Home Depot USA, Inc., The Home Dept Inc., and Home Depot Product Authority, LLC* Case No. 6:21-cv-00097 Complaint for Patent Infringement dated Jan. 29, 2021, 88 pages—Ex. 1004.

*Lynk Labs, Inc.*, v. *Home Depot USA, Inc., The Home Dept Inc., and Home Depot Product Authority, LLC* Case No. 6:21-cv-00097-ADA Plaintiff Lynk Labs, Inc,'s Amended Preliminary Infringement Contentions '149 Patent dated Jun. 23, 2021, 154 pages—Ex. 1005.

U.S. Appl. No. 16/215,502, filed Dec. 10, 2018, 359 pages - Ex. 1006.

IEEE 100 The Authoritative Dictionary of IEEE Standards Terms, Seventh Edition, Published by Standards Informaiton Network IEEE Press, pp. 1-4—Ex. 1007.

*Lynk Labs, Inc.*, v. *Home Depot USA, Inc., The Home Dept Inc., and Home Depot Product Authority, LLC* Case No. 6:21-cv-00097-ADA Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783 and 10,932,341 filed Oct. 6, 2021, 38 pages—Ex. 1015.

U.S. Appl. No. 16/274,164, filed Feb. 12, 2019, 543 pages—Ex. 1016.

Heat Sink, Merriam-Webster; Examples of heat sink in a sentence, http://wwwmerriam-webster.com/dictionary/heat%20sink, 7 pages—Ex. 1017.

Insulator, Britannica Online Encylopedia Full Article, http://www.britannica.com/print/article/289459, 2 pages—Ex. 1018.

*Home Depot USA, Inc.*, v. *Lynk Labs, Inc.* Case IPR2022-00023 U.S. Pat. No. 10,517,149 Issue Date Dec. 24, 2019, Petition for Inter Partes Review dated Oct. 20, 2021, 74 pages.

*Home Depot USA, Inc.*, v. *Lynk Labs, Inc.* Case IPR2022-00023 U.S. Pat. No. 10,517,149 Issue Date Dec. 24, 2019, Petitioner's Power of Attorney dated Oct. 20, 2021, 2 pages.

*Home Depot USA, Inc.*, v. *Lynk Labs, Inc.* Case IPR2022-00023 U.S. Pat. No. 10,517,149 Issue Date Dec. 24, 2019, Patent Owner's Mandatory Notices Pursuant to 37 C.F.R. Section 42.8 dated Nov. 10, 2021, 5 pages.

Petition for Inter Partes Review, *Home Depot USA, Inc.*, Petitioner, v. *Lynk Labs, Inc.*, Patent Owner, Case PR2021-01370 U.S. Pat. No. 10,349,479, Issue Date Jul. 9, 2019, Title: "Color Temperature Controlled and Low THD LED Lighting Devices and Systems and Methods of Driving the Same," 52 pages dated Aug. 18, 2021.

Petitioners' Power of Attorney, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 2 pages dated Aug. 17, 2021.

Declaration of Dr. Dean Neikirk U.S. Pat. No. 10,349,479, Inter Partes Review No. IPR2021-01370, 98 pages—Ex 1002.

U.S. Appl. No. 15/369,218, filed Dec. 5, 2016, 617 pages—Ex 1003.

U.S. Appl. No. 61/630,025, filed Dec. 2, 2011, 39 pages—Ex 1011.

U.S. Appl. No. 61/570,200, filed Dec. 13, 2011, 51 pages—Ex 1012.

Complaint for Patent Infringement, Case No. 6:21-cv-00097, *Lynk Labs, Inc.* v. *Home Depot USA, Inc., The Home Depot Inc., and Home Depot Product Authority, LLC*, dated Jan. 29, 2021, 88 pages—Ex 1014.

Plaintiff Amended Preliminary Infringement Contentions, Lynk Lab's, Inc.'s, Case No. 6:21-cv-00097-ADA, *Lynk Labs, Inc.* v. *Home Depot USA, Inc., The Home Depot Inc., and Home Depot Product Authority, LLC*, dated Jun. 23, 2021, 7 pages—Ex 1015.

Scheduling Order, Case No. 6:21-cv-00097-ADA, *Lynk Labs, Inc.* v. *Home Depot USA, Inc., The Home Depot Inc., and Home Depot Product Authority, LLC*, filed Aug. 13, 2021, 4 pages—Ex 1016.

*Samsung Electronics Co., Ltd.* v. *Lynk Labs, Inc.* U.S. Pat. No. 10,517,149 Petition for Inter Partes Review of U.S. Pat. No. 10,517, 149, 98 pages.

*Samsung Electronics Co., Ltd.* v. *Lynk Labs, Inc.* U.S. Pat. No. 10,517,149 Power of Attorney for Petitioner Samsung Electronics Co., Ltd. 3 pages.

*Samsung Electronics Co., Ltd.* v. *Lynk Labs, Inc.* Case IPR2022-00098, U.S. Pat. No. 10,4517,149 Notice of Filing Date Accorded to Petition, mailed Nov. 23, 2021, 6 pages.

*Samsung Electronics Co., Ltd.* v. *Lynk Labs, Inc.* Case: IPR2022-00098, U.S. Pat. No. 10,517,149 Patent Owner's Mandatory Notices Pursuant to 37 C.F.R. Section 42.8, 5 pages.

(56) References Cited

OTHER PUBLICATIONS

*Samsung Electronics Co., Ltd.* v. *Lynk Labs, Inc.*, U.S. Pat. No. 10,517,149 Declaration of R. Jacob Baker, Ph.D., P.E. in Support of Petition for Inter Partes Review of U.S. Pat. No. 10,517,149, 179 pages—Ex. 1002.
R. Jacob (Jake) Baker, Ph.D., P.E. CV, 37 pages—Ex. 1003.
File History of U.S. Pat. No. 10,517,149, 359 pages—Ex. 1004.
Watson Mastering Electronics, Third Edition, pp. 1-151—Ex. 1018.
PCT File History US/2010/62235, filed Dec. 28, 2010—Ex. 1039.
PCT File History US/2010/001597, filed May 28, 2010—Ex. 1043.
PCT File History US/2010/001269, filed Apr. 30, 2010—Ex. 1044.
U.S. Appl. No. 61/333,963, filed May 12, 2010—Ex. 1046.
U.S. Appl. No. 61/284,927, filed Dec. 28, 2009—Ex. 1047.
U.S. Appl. No. 60/335,963, filed Dec. 31, 2009—Ex. 1048.
U.S. Appl. No. 60/997,771, filed Oct. 6, 2007—Ex. 1049.
U.S. Appl. No. 60/547,653, filed Feb. 25, 2004—Ex. 1050.
U.S. Appl. No. 60/559,867, filed Feb. 25, 2004—Ex. 1051.
U.S. Appl. No. 61/217,215, filed May 28, 2009—Ex. 1052.
U.S. Appl. No. 61/215,144, filed May 1, 2009—Ex. 1053.
Civil Docket for Case# 6:21-cv-02665, Northern District of Illinois, Samsung Electronics. Co., Ltd., filed May 17, 2021, 14 pages—Ex. 1061.
US District Court for the Northern District of Illinois, Estimated Patent Case Schedule, 2 pages—Ex. 1062.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, Aug. 31, 2021 9 pages—Ex. 1066.
Sedra/Smith, "Microelectronic Circuits," Fourth Edition, Part 1 of 4, pp. 1-161—Ex. 1041, Ex. 1061, Ex. 1054.
Sedra/Smith, "Microelectronic Circuits," Fourth Edition, Part 2 of 4, pp. 162-1048 pages—Ex. 1041, Ex. 1061, Ex. 1054.
Sedra/Smith, "Microelectronic Circuits," Fourth Edition, Part 3 of 4, pp. 1049-1230 pages—Ex. 1041, Ex. 1061, Ex. 1054.
Sedra/Smith, "Microelectronic Circuits," Fourth Edition, Part 4 of 4, pp. 1231-1237 pages—Ex. 1041, Ex. 1061, Ex. 1054.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1066.
U.S. Pat. No. 10,517,149 ("the '149 Patent") Exemplary Infringement Contention Claim Charts, Appendix A-5 through I-3—Ex. 1067.
*Samsung Electronics Co., Ltd et al.* v. *Lynk Labs, Inc.* Case No. 1:21-cv-02665, Notification of Docket Entry Jul. 27, 2021, 1 page—Ex. 1068.
*Samsung Electronics Co., Ltd et al.* v. *Lynk Labs, Inc.* Case No. 1:21-cv-02665, Scheduling Order dated Aug. 19, 2021, 2 pages—Ex. 1069.
Civil Docket for Case# 6:21-cv-00097-ADA, Western District of Texas (Waco)—Lynk Labs, Inc. filed Jan. 29, 2001, 9 pages—Ex. 1074.
*Samsung Electronics Co., Ltd. et al.* v. *Lynk Labs, Inc.* Case No. 1:21-cv-02665, Notification of Docket Entry Oct. 18, 2021, 1 page—Ex. 1070.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1071.
*Lynk Labs, Inc.*, v. *Home Dept USA, Inc., The Home Depot Inc., and Home Depot Product Authority, LLC*, Case. No. 6:21-cv-00097, Complaint for Patent Infringement dated Jan. 29, 2021, 88 page—Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint for Patent Infringement dated Mar. 17, 2021, 94 pages—Ex. 1073.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1075.
Tim Williams, The Circuit Designer's Companion, First Published 1991, ISBN 0 7506 1142 1, 314 pages—Ex. 1094.
*Samsung Electronics Co., Ltd.* v. *Lynk Labs, Inc.* Patent Owner—U.S. Pat. No. 10,154,551 Petition for Inter Partes Review of U.S. Pat. No. 10,154,551—90 pages.
*Samsung Electronics Co., Ltd.* v. *Lynk Labs, Inc.* Patent Owner—U.S. Pat. No. 10,154,551 Power of Attorney for Petitioner Samsung Electronics, Co., Ltd. U.S. Pat. No. 10,154,551—3 pages.
*Samsung Electronics Co., Ltd.* v. *Lynk Labs, Inc.* Patent Owner—U.S. Pat. No. 10,652,979 Petition for Inter Partes Review of U.S. Pat. No. 10,652,979—84 pages.
*Samsung Electronics Co., Ltd.* v. *Lynk Labs, Inc.* Patent Owner—U.S. Pat. No. 10,652,979 Power of Attorney for Petitioner Samsung Electronics, Co., Ltd. U.S. Pat. No. 10,652,979—3 pages.
*Samsung Electronics Co., Ltd.* v. *Lynk Labs, Inc.* Patent Owner—PU.S. Pat. No. 10,154,551 Declaration of R. Jacob Baker, Ph.D., P.E. in support of Petition For Inter Partes Review of U.S. Pat. No. 10,154,551—175 pages—Ex. 1002.
R. Jacob (Jake) Baker, Ph.D., P.E. CV—36 pages, Patents '252, '298, '466, '551, '674, '697, '979—Ex-1003.
File History U.S. Pat. No. 10,154,551 U.S. Appl. No. 15/797,806 dated Oct. 30, 2017—Ex. 1004.
Williams, Tim, "The Circuit Designer's Companion," 2021, 314 pages—(Parts 1 and 2), '551 Ex. 1013.
Chambers, Dictionary of Science and Technology, published Chambers Harrap Publishers Ltd 1999, 8 pages, '551—Ex. 1024.
*Samsung Electronics Co. Ltd. and Samsung Electronics America, Inc.* v. *Lynk Labs, Inc.* Defendant Lynk Labs, Inc.'s Supplement to Second Amended Preliminary Infringement Contentions ('551 Patent and '979 Patent), Case No. 1:21-cv-02665, filed Sep. 22, 2021, 14 pages—Ex. 1072.
*Lynk Labs, Inc.* v. *Samsung Electronics Co. Ltd. and Samsung Electronics America, Inc.* Case No. 6:21-cv-00526 Complaint for Patent Infringement filed May 25, 2021, '551 12 pages—Ex. 1074.
*Lynk Labs, Inc.* v. *Samsung Electronics Co. Ltd. and Samsung Electronics America, Inc.* Case No. 6:21-cv-00526 First Amended Complaint for Patent Infringement filed Jun. 9, 2021, 18 pages—Ex. 1075.
*Samsung Electronics Co. Ltd. and Samsung Electronics America, Inc.* v. *Lynk Labs, Inc.* Samsung Electronics Co., Ltd. and Samsung Electronics America, Inc,'s Second Amended Complaint for Declaratory Judgment of Non-Infringement, Case No. 1:21-cv-02665, filed Sep. 8, 2021, 44 pages—Ex. 1076.
*Samsung Electronics Co. Ltd. et al.* v. *Lynk Labs, Inc.* Civil Docket for Case #1:21-cv-02665 dated Sep. 27, 2021 '551 12 pages—Ex. 1077.
*Lynk Labs, Inc.* v. *Samsung Electronics Co. Ltd. et al.* Civil Docket for Case #6:21-cv-00526-ADA dated Sep. 27, 2021 '551 8 pages—Ex. 1078.
*Lynk Labs, Inc.* v. *Samsung Electronics Co. Ltd. et al.* Civil Docket for Case #1:21-cv-05126 dated Sep. 29, 2021 '551 8 pages—Ex. 1079.
*Lynk Labs, Inc.* v. *Samsung Electronics Co. Ltd. et al.* Case No. 6:21-cv-00526-ADS Order Granting Plaintiff Lynk abs, Inc.'s Stipulation to Transfer '551 2 pages—Ex. 1080.
*Samsung Electronics Co., Ltd.* v. *Lynk Labs, Inc.* Patent Owner—U.S. Pat. No. 10,652,979 Declaration of R. Jacob Baker, Ph.D., P.E. in support of Petition For Inter Partes Review of U.S. Pat. No. 10,652,979—174 pages—Ex. 1002.
McGraw-Hill Dictionary of Scientific and Technical Term, Sixth Edition, '979—9 pages—Ex. 1018.
Declaration of R. Jacob Baker. Ph.D., P.E. U.S. Pat. No. 10,154,551, Inter Partes Review of U.S. Pat. No. 10,154,551, 176 pages—Ex 1002.
*Samsung Electronics Co. Ltd. and Samsung Electronics America, Inc.* v. *Lynk Labs, Inc.* Case No. 1:21-cv-02665, Samsung's Initial Non-Infringement, Unenforceability, and Invalidity Contentions dated Sep. 21, 2021—85 pages.
U.S. Pat. No. 10,492,251 ('251 Patent)—Exhibit A-01—Lys '262.

(56) References Cited

OTHER PUBLICATIONS

U.S. Pat. No. 10,492,251 ('251 Patent)—Exhibit A-02—KR '747.
U.S. Pat. No. 10,492,251 ('251 Patent)—Exhibit A-03—KR '215.
U.S. Pat. No. 10,492,251 ('251 Patent)—Exhibit A-04—iColor System.
U.S. Pat. No. 10,492,251 ('251 Patent)—Exhibit A-05—Miskin '299.
U.S. Pat. No. 10,492,252 ('252 Patent)—Exhibit B-01—Piepgrass.
U.S. Pat. No. 10,492,252 ('252 Patent)—Exhibit B-02—Hitachi.
U.S. Pat. No. 10,492,252 ('252 Patent)—Exhibit B-03—Mueller.
U.S. Pat. No. 10,492,252 ('252 Patent)—Exhibit B-04—NEC.
U.S. Pat. No. 10,492,252 ('252 Patent)—Exhibit B-05—Miskin '299.
U.S. Pat. No. 10,492,252 ('252 Patent)—Exhibit B-06—Mac Powerbook G3.
U.S. Pat. No. 10,492,252 ('252 Patent)—Exhibit B-07—iPod G3.
U.S. Pat. No. 10,492,252 ('252 Patent)—Exhibit B-08—iPAQ H5500.
U.S. Pat. No. 10,499,466 ('466 Patent)—Exhibit C-01—Piepgrass.
U.S. Pat. No. 10,499,466 ('466 Patent)—Exhibit C-02—Hitachi.
U.S. Pat. No. 10,499,466 ('466 Patent)—Exhibit C-03—Mueller.
U.S. Pat. No. 10,499,466 ('466 Patent)—Exhibit C-04—NEC.
U.S. Pat. No. 10,499,466 ('466 Patent)—Exhibit C-05—Miskin '299.
U.S. Pat. No. 10,499,466 ('466 Patent)—Exhibit C-06—Mac Powerbook G3.
U.S. Pat. No. 10,499,466 ('466 Patent)—Exhibit C-07—iPod G3.
U.S. Pat. No. 10,499,466 ('466 Patent)—Exhibit C-08—iPAQ H5500.
U.S. Pat. No. 10,506,674 ('674 Patent)—Exhibit D-01—Piepgrass.
U.S. Pat. No. 10,506,674 ('674 Patent)—Exhibit D-02—Hitachi.
U.S. Pat. No. 10,506,674 ('674 Patent)—Exhibit D-03—Mueller.
U.S. Pat. No. 10,506,674 ('674 Patent)—Exhibit D-04—NEC.
U.S. Pat. No. 10,506,674 ('674 Patent)—Exhibit D-05—Miskin '299.
U.S. Pat. No. 10,506,674 ('674 Patent)—Exhibit D-06—Mac Powerbook G3.
U.S. Pat. No. 10,506,674 ('674 Patent)—Exhibit D-07—iPod G3.
U.S. Pat. No. 10,506,674 ('674 Patent)—Exhibit D-08—iPAQ H5500.
U.S. Pat. No. 10,517,149 ('149 Patent)—Exhibit E-01—Lys '626.
U.S. Pat. No. 10,517,149 ('149 Patent)—Exhibit E-02—KR '747.
U.S. Pat. No. 10,517,149 ('149 Patent)—Exhibit E-03—KR '215.
U.S. Pat. No. 10,517,149 ('149 Patent)—Exhibit E-04—iColor System.
U.S. Pat. No. 10,517,149 ('149 Patent)—Exhibit E-05—Miskin '299.
U.S. Pat. No. 10,687,400 ('400 Patent)—Exhibit F-01—Lys '626.
U.S. Pat. No. 10,687,400 ('400 Patent)—Exhibit F-02—KR '747.
U.S. Pat. No. 10,687,400 ('400 Patent)—Exhibit F-03—CK LEDs.
U.S. Pat. No. 10,687,400 ('400 Patent)—Exhibit F-04—Miskin '299.
U.S. Pat. No. 10,750,583 ('583 Patent)—Exhibit G-01—Lys '626.
U.S. Pat. No. 10,750,583 ('583 Patent)—Exhibit G-02—KR 747.
U.S. Pat. No. 10,750,583 ('583 Patent)—Exhibit G-03—KR 215.
U.S. Pat. No. 10,750,583 ('583 Patent)—Exhibit G-04—iColor System.
U.S. Pat. No. 10,750,583 ('583 Patent)—Exhibit G-05—Piepgrass.
U.S. Pat. No. 10,750,583 ('583 Patent)—Exhibit G-06—Miskin '299.
U.S. Pat. No. 10,966,298 ('298 Patent)—Exhibit H-01—Piepgrass.
U.S. Pat. No. 10,966,298 ('298 Patent)—Exhibit H-02—Hitachi.
U.S. Pat. No. 10,966,298 ('298 Patent)—Exhibit H-03—Mueller.
U.S. Pat. No. 10,966,298 ('298 Patent)—Exhibit H-04—NEC.
U.S. Pat. No. 10,966,298 ('298 Patent)—Exhibit H-05—Miskin '299.
*Samsung Electronics Co., Ltd.* v. *Lynk Labs, Inc.* U.S. Pat. No. 10,687,400, Declaration of R. Jacob Baker Ph.D., P.E. in Support of Petition for Inter Partes Review of U.S. Pat. No. 10,687,400 dated Nov. 5, 2021—177 pages Ex. 1002.
Baker CV—37 pages Ex. 1003.
File History of U.S. Pat. No. 10,687,400 Parts 1-4 1181 pages Ex. 1004.
Watson Mastering Electronics, Third Edition, pp. 1-151—Ex. 1030, Ex. 1012, Ex. 1018, Ex. 1031.
Sedra/Smith, "Microelectronic Circuits," Fourth Edition, Parts 1-4, 515 pages Ex. 1034, Ex. 1041, Ex. 1061, Ex. 1054.
Chamber Dictionary of Science and Technology, General Editor Professor Peter MB Walker, CBE, FRSE, Chambers Harrap Published Ltd. 1999 ISBN 0 550 14110 3, 4 pages Ex. 1047, Ex. 1024.
McGraw-Hill Dictionary of Scientific and Technical Terms, Sixth Edition, Library of Congress Cataloging in Publication Data , ISBN 0-07-042313-X, pp. 4 Ex. 1048, Ex. 1018.
U.S. Appl. No. 61/33,963, filed May 12, 2010 Ex. 1063.
U.S. Appl. No. 61/284,927, filed Dec. 28, 2009 Ex. 1064.
U.S. Appl. No. 61/335,069, filed Dec. 31, 2009 Ex. 1065.
U.S. Appl. No. 60/997,771, filed Oct. 6, 2007 Ex. 1066.
U.S. Appl. No. 60/547,653, filed Mar. 2, 2004 Ex. 1067.
U.S. Appl. No. 60/559,867, filed Apr. 8, 2004 Ex. 1068.
U.S. Appl. No. 61/217,215, filed May 28, 2009 Ex. 1069.
U.S. Appl. No. 61/215,144, filed May 1, 2009 Ex. 1070.
Docket from *Samsung Electronics Co., Ltd. et al.*v. *Lynk Labs, Inc.* No. 1:21-cv-02665 printed Nov. 5, 2021—14 pages Ex. 1076.
Estimated Patent Case Schedule in Northern District of Illinois—2 pages Ex. 1079, Ex. 1062.
"Defendant Lynk Labs, Inc.'s Preliminary Infringement Contentions" from *Samsung Electronics Co. Ltd. et al* v. *Lynk Labs, Inc.*, Case No. 1:21-cv-02665 filed Jul. 21, 2021—9 pages Ex. 1080.
U.S. Pat. No. 10,687,400 ("the '400 Patent") Exemplary Infringement Chart ACOM Round (US) as Appendix K-1—9 pages Exs. 1081, 1084.
"Defendant Lynk Labs, Inc.'s Answer to Plaintiffs Samsung Electronics Co., Ltd. and Samsung Electronics America, Inc.'s First Amended Complaint and Counterclaims" from *Samsung Electronics Co. Ltd. et al* v. *Lynk Labs, Inc.*, Case No. 1:21-cv-02665 filed Aug. 3, 2021—67 pages Ex. 1082, Ex. 1071.
"Defendant Lynk Labs, Inc.'s Amended Preliminary Infringement Contentions" from *Samsung Electronics Co. Ltd. et al* v. *Lynk Labs, Inc.*, Case No. 1:21-cv-02665 filed Aug. 31, 2021—9 pages Ex. 1083, Ex. 1066.
"Notification of Docket Entry" from *Samsung Electronics Co. Ltd. et al* v. *Lynk Labs, Inc.*, Case No. 1:21-cv-02665 filed Jul. 27, 2021—1 page Ex. 1085, Ex. 1068.
"Order" from *Samsung Electronics Co. Ltd. et al* v. *Lynk Labs, Inc.*, Case No. 1:21-cv-02665, filed Aug. 19, 2021—2 pages Ex. 1086.
"Supplemental Report of Parties' Planning Meeting" from *Samsung Electronics Co. Ltd. et al* v. *Lynk Labs, Inc.*, Case No. 1:21-cv-02665, filed Oct. 14, 2021—11 pages Ex. 1087, Ex. 1075, Ex. 1080.
"Defendant Lynk Labs, Inc.'s Supplement to Second Amended Preliminary Infringement Contentions ('551 Patent and 979 Patent)" from *Samsung Electronics Co. Ltd. et al* v. *Lynk Labs, Inc.*, Case No. 1:21-cv-02665, filed Sep. 22, 2021—20 pages Ex. 1072.
"Order" from *Samsung Electronics Co. Ltd. et al* v. *Lynk Labs, Inc.*, Case No. 1:21-cv-02665, filed Oct. 18, 2021—1 page Ex. 1088.
Tim Williams, The Circuit Designer's Companion, First Published 1991, ISBN 0 7506 1142 1, 314 pages—Ex. 1089, Ex. 1094.
*Samsung Electronics Co., Ltd.* v. *Lynk Labs, Inc.* U.S. Pat. No. 10,687,400, Petition for Inter Partes Review of U.S. Pat. No. 10,687,400 dated Nov. 12, 2021—96 pages.
*Samsung Electronics Co., Ltd.* v. *Lynk Labs, Inc.* U.S. Pat. No. 10,687,400, Power of Attorney for Petitioner Samsung Electronics Co., Ltd. dated Oct. 8, 2021—3 pages.
*Samsung Electronics Co., Ltd.* v. *Lynk Labs, Inc.* U.S. Pat. No. 10,687,400, Petitioner's Notice Regarding Multiple Petitions dated Nov. 12, 2021—9 pages.
*Samsung Electronics Co., Ltd.* v. *Lynk Labs, Inc.* U.S. Pat. No. 10,687,400, Patent Owner's Mandatory Notices Pursuant to 37 C.F.R. § 42.8 dated Nov. 19, 2021—5 pages.
Petition for Inter Partes Review, *Home Depot USA, Inc.*, Petitioner, v. *Lynk Labs, Inc.*, Patent Owner, Case PR2021-01369 U.S. Pat. No. 10,492,251, Issue Date Nov. 26, 2019, Title: "AC Light Emitting Diode and AC LED Drive Methods and Apparatus, " 53 pages dated Aug. 18, 2021.

(56) References Cited

OTHER PUBLICATIONS

Petitioners' Power of Attorney, *Home Depot USA, Inc.*, Petitioner, v. *Lynk Labs, Inc.*, Patent Owner, Case PR2021-01369 U.S. Pat. No. 10,492,251, Issue Date Nov. 26, 2019, Title: "AC Light Emitting Diode and AC LED Drive Methods and Apparatus," 53 pages dated Aug. 17, 2021.
Declaration of Dr. Lebby U.S. Pat. No. 10,492,251dated Aug. 18, 2021, 134 pages—Ex 1002.
U.S. Appl. No. 16/148,945, filed Oct. 1, 2018—Ex. 1003.
Complaint for Patent Infringement, *Lynk Labs, Inc.* v. *Home Depot USA, Inc., The Home Depot Inc., and Home Depot Product Authority, LLC*, Case No. 6:21-cv-00097 dated Jan. 29, 2021, 88 pages—Ex. 1010.
Plaintiff Lynk Labs, Inc.'s Amended Preliminary Infringement Contentions, *Lynk Labs, Inc.* v. *Home Depot USA, Inc., The Home Depot Inc., and Home Depot Product Authority, LLC*, Case No. 6:21-cv-00097-ADA, dated Jun. 23, 2021, 7 pages—Ex. 1011.
Scheduling Order, *Lynk Labs, Inc.* v. *Home Depot USA, Inc., The Home Depot Inc., and Home Depot Product Authority, LLC*, Case No. 6:21-cv-00097-ADA, filed Aug. 13, 2021, 4 pages—Ex. 1012.
U.S. Appl. No. 61/333,963, filed May 12, 2010, 52 pages—IPR2021-01299 Ex 1036; IPR2021-10347 Ex 1055' IPR2021-01346 Ex 1036, IPR2021-01345 Ex 1037; IPR2021-01300 Ex 1036.
U.S. Appl. No. 61/284,927, filed Dec. 28, 2009, 54 pages—IPR2021-01299 Ex 1037; IPR2021-10347 Ex 1056; IPR2021-01346 Ex 1037, IPR2021-01345 Ex 1037; IPR2021-01300 Ex 1037.
U.S. Appl. No. 61/335,069, filed Dec. 31, 2009, 65 pages—IPR2021-01299 Ex 1038; IPR2021-10347 Ex 1057; IPR2021-01346 Ex 1038, IPR2021-01345 Ex 1038, IPR2021-01300 Ex 1038.
U.S. Appl. No. 60/997,771, filed Oct. 6, 2007, 26 pages—IPR2021-01299 Ex 1039; IPR2021-10347 Ex 1058; IPR2021-01346 Ex 1039, IPR2021-01345 Ex 1039; IPR2021-01300 Ex 1039.
U.S. Appl. No. 60/547,653, filed Feb. 25, 2004, 84 pages—IPR2021-01299 Ex 1040; IPR2021-10347 Ex 1059; IPR2021-01346 Ex 1040, IPR2021-01345 Ex 1040; IPR2021-01300 Ex 1040.
U.S. Appl. No. 60/559,867, filed Feb. 25, 2004, 90 pages—IPR2021-01299 Ex 1041; IPR2021-10347 Ex 1060; IPR2021-01346 Ex 1041, IPR2021-01345 Ex 1041; IPR2021-01300 Ex 1041.
U.S. Appl. No. 61/217,215, filed May 28, 2008, 47 pages—IPR2021-01299 Ex 1042; IPR2021-10347 Ex 1061; IPR2021-01346 Ex 1042, IPR2021-01345 Ex 1042; IPR2021-01300 Ex 1042.
U.S. Appl. No. 61/215,144, filed May 1, 2009, 11 pages—IPR2021-01299 Ex 1043; IPR2021-10347 Ex 1062; IPR2021-01346 Ex 1043, IPR2021-01345 Ex 1043; IPR2021-01300 Ex 1043.
Watson, John, Mastering Electonics, Third Ed., McGraw Hill Inc., published in 1990—IPR2021-01299 Ex 1080; IPR2021-10347 Ex 1026; IPR2021-01346 Ex 1062; IPR2021-01345 Ex 1060; IPR2021-01300 Ex 1006.
Sedra, A., et al., Microelectronic Circuits, Fourth Ed., Oxford University Press, published in 1998—IPR2021-01299 Ex 1081; IPR2021-10347 Ex 1027; IPR2021-01346 Ex 1063; IPR2021-01345 Ex 1061 (4 parts); IPR2021-01300 Ex 1007.
Compaq Comp. Corp. et al., Universal Serial Bus Specification Revision 2.0 published in 2000, 650 pages—IPR2021-01299 Ex 1091; IPR2021-10347 Ex 1095; IPR2021-01346 Ex 1069; IPR2021-01345 Ex 1072; IPR2021-01300 Ex 1055.
Declaration of R. Jacob Baker. Ph.D., P.E. U.S. Pat. No. 10,966,298, Inter Partes Review No. IPR2021-01347, 152 Pages—Ex 1002.
Gilbisco, Stan, Handbook of Radio & Wireless Technology, published in 1999, 188 pages, McGraw-Hill—IPR2021-10347 Ex 1013.
Petition for Inter Partes Review, *Samsung Electronics Co., Ltd.*, Petitioner, v. *Lynk Labs, Inc.*, Patent Owner, Case IPR2021-01347 U.S. Pat. No. 10,966,298, Issue Date Dec. 3, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc.*, Patent Owner, Case IPR2021-01346 U.S. Pat. No. 10,499,466, Issue Date Dec. 10, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc.*, Patent Owner, Case IPR2021-01345 U.S. Pat. No. 10,492,252, Issue Date Nov. 26, 2019, Title: "AC Light Emitting Diode and AC LED Drive Methods and Apparatus," 65 pages dated Sep. 7, 2021.
Petition for Inter Partes Review, *Samsung Electronics Co., Ltd.*, Petitioner, v. *Lynk Labs, Inc.*, Patent Owner, Case IPR2021-01300 U.S. Pat. No. 11,019,697, Issue Date May 25, 2019, Title: "AC Light Emitting Diode and AC LED Drive Methods and Apparatus," 71 pages dated Sep. 7, 2021.
Petition for Inter Partes Review, *Samsung Electronics Co., Ltd.*, Petitioner, v. *Lynk Labs, Inc.*, Patent Owner, Case IPR2021-01299 U.S. Pat. No. 10,506,674, Issue Date Dec. 10, 2019, Title: "AC Light Emitting Diode and AC LED Drive Methods and Apparatus," 70 pages dated Sep. 7, 2021.
Plaintiff's First Amended Complaint for Patent Infringement, Case No. 6:21-cv-00526-ADA, *Lynk Labs, Inc.* v. *Samsung ElectronicsCo., Ltd. and Samsung Electronics America, Inc.* dated Jun. 9, 2021, 18 pages—IPR2021-01346 Ex 1080, IPR2021-01345 Ex 1056; IPR2021-01300 Ex 1086.
Defendant's Preliminary Infringement Contentions, Case No. 1:21-cv-2655, *Samsung Electronics Co., Ltd. and Samsung Electronics America, Inc.* v. *Lynk Labs, Inc.*, dated Jul. 21, 2021, 9 pages—IPR2021-01346 Ex 1081, IPR2021-01345 Ex 1057, IPR2021-01300 Ex 1080.
Defendant's Answer and Counterclaims, Case No. 1:21-cv-2665, *Samsung Electronics Co., Ltd. and Samsung Electronics America, Inc.* v. *Lynk Labs, Inc.*, dated Aug. 3, 2021, 67 pages—IPR2021-01346 Ex 1083, IPR2021-01345 Ex 1077, IPR2021-01300 Ex 1082.
Defendant's Amended Preliminary Infringement Contentions, Case No. 1:21-cv-2665, *Samsung Electronics Co., Ltd. and Samsung Electronics America, Inc.* v. *Lynk Labs, Inc.*, dated Aug. 31, 2021, 9 pages—IPR2021-01346 Ex 1086; IPR2021-01345 Ex 1086; IPR2021-01300 Ex 1087.
Scheduling Order, Case No. 1:21-cv-2665, *Samsung Electronics Co., Ltd. and Samsung Electronics America, Inc.* v. *Lynk Labs, Inc.*, dated Aug. 19, 2021—IPR2021-01346 Ex 1085, IPR2021-01345 Ex 1085, IPR2021-01300 Ex 1084.
Notification of Docket Entry, Case No. 1:21-cv-2665, *Samsung Electronics Co., Ltd. and Samsung Electronics America, Inc.* v. *Lynk Labs, Inc.*, dated Jul. 27, 2021, 1 page—IPR2021-01346 Ex 1084, IPR2021-01345 Ex 1084, IPR2021-01300 Ex 1083.
Declaration of R. Jacob Baker. Ph.D., P.E. U.S. Pat. No. 10,499,466, 187 pages, Inter Partes Review No. IPR2021-01346—Ex 1002.
Declaration of R. Jacob Baker. Ph.D., P.E. U.S. Pat. No. 10,492,252, 148 pages, Inter Partes Review No. IPR2021-01345—Ex 1002.
Declaration of R. Jacob Baker. Ph.D., P.E. U.S. Pat. No. 11,019,697, 261 pages, Inter Partes Review No. IPR2021-01300—Ex 1002.
Declaration of R. Jacob Baker. Ph.D., P.E. U.S. Pat. No. 10,506,674, 172 pages, Inter Partes Review No. IPR2021-01299—Ex 1002.
Declaration of R. Jacob Baker. Ph.D., P.E. U.S. Pat. No. 10,999,298, 152 pages, Inter Partes Review No. IPR2021-01347—Ex 1002.
Plaintiff's Complaint, Case No. 1:21-cv-2665, *Lynk Labs, Inc.* v. *Samsung Electronics Co., Ltd. and Samsung Electronics America, Inc.*, dated May 25, 2021, 12 pages—IPR2021-01300 Ex 1074.
Plaintiff's First Amended Complaint, Case No. 1:21-cv-2665, *Samsung Electronics Co., Ltd. and Samsung Electronics America, Inc.* v. *Lynk Labs, Inc.*, dated May 25, 2021, 33 pages—IPR2021-01300 Ex 1075.
Plaintiff's Complaint, Case No. 1:21-cv-2665, *Samsung Electronics Co., Ltd. and Samsung Electronics America, Inc.* v. *Lynk Labs, Inc.*, dated May 17, 2021, 30 pages—IPR2021-01300 Ex 1076.
The Microarchitecture of the Pentium 4 Processor by Hinton et al., published in 2001, 13 pages—IPR2021-01300 Ex 1017.
Wireless Medium Access Control (MAC) and Physical Layer (PHY) Specifications for Wireless Personal Area Networks (WPANs) by IEEE Computer Society, 1018 IEEE 812.15.1, published in 2002, 1168 pages—IPR2021-01300 Ex 1018.
*Samsung Electronics Co., Ltd.*, v. *Lynk Labs, Inc.* Patent Owner—Power of Attorney for Petitioner Samsung Electronics Co., Ltd. U.S. Pat. No. 10,492,252, dated Jul. 21, 2021—3 pages.

(56) References Cited

OTHER PUBLICATIONS

*Samsung Electronics Co., Ltd.*, v. *Lynk Labs, Inc.*, Case IPR2021-01345 , U.S. Pat. No. 10,492,252—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01345 , U.S. Pat. No. 10,492,252—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 10,966,298 dated Jul. 21, 2021—3 pages.
*Samsung Electronics Co., Ltd.*, v. *Lynk Labs, Inc.*, Case IPR2021-01347, U.S. Pat. No. 10,966,298—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01347 , U.S. Pat. No. 10,966,298—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 10,499,466 dated Jul. 21, 2021—3 pages.
*Samsung Electronics Co., Ltd.*, v. *Lynk Labs, Inc.*, Case IPR2021-01346, U.S. Pat. No. 10,499,466—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01346 , U.S. Pat. No. 10,499,466—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 11,019,697 dated Jul. 21, 2021—3 pages.
*Samsung Electronics Co., Ltd.*, v. *Lynk Labs, Inc.*, Case IPR2021-01300, U.S. Pat. No. 11,019,697—Notice of Filing Date Accorded to Petition and Time for Filing Patent Owner Preliminary Response filed Sep. 7, 2021—6 pages.
*Samsung Electronics Co., Ltd.*, v. *Lynk Labs, Inc.*, Case IPR2021-01300 , U.S. Pat. No. 11,019,697—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.*, Case IPR2021-01300 , U.S. Pat. No. 11,019,697—Petitioner's Response to Notice of Filing Date Accorded to Petition and Time for Filing Patent Owner Preliminary Response (Paper No. 3) dated Sep. 20, 2021—3 pages.
*Samsung Electronics Co., Ltd.*, v. *Lynk Labs, Inc.*, Case IPR2021-01300 , U.S. Pat. No. 11,019,697—Notice of Accepting Corrected Petition filed Sep. 20, 2021—2 pages.
*Samsung Electronics Co., Ltd.*, v. *Lynk Labs, Inc.* Patent Owner—Power of Attorney for Petitioner Samsung Electronics Co., Ltd. U.S. Pat. No. 10,506,674 dated Jul. 21, 2021—3 pages.
*Samsung Electronics Co., Ltd.*, v. *Lynk Labs, Inc.*, Case IPR2021-01299, U.S. Pat. No. 10,506,674—Notice of Filing Date Accorded to Petition and Time for Filing Patent Owner Preliminary Response filed Sep. 7, 2021—6 pages.
*Home Depot U.S.A., Inc.*, v. *Lynk Labs, Inc.*, U.S. Pat. No. 10,932,341, Filing Date: Jan. 10, 2020, Issue Date: Feb. 23, 2021—IPGR2022-00009; Declaration of Dr. Dean Neikirk U.S. Pat. No. 10,932,341, 140 pages—Ex. 1002.
*Home Depot U.S.A., Inc.*, v. *Lynk Labs, Inc.*, U.S. Pat. No. 10,932,341, Filing Date: Jan. 10, 2020, Issue Date: Feb. 23, 2021—IPGR2022-00009; Petition for Post Grant Review of U.S. Pat. No. 10,932,341, 94 pages.
U.S. Appl. No. 16/740,295, filed Jan. 10, 2020 (Part 1) 768 pages—Ex. 1003.
U.S. Appl. No. 16/740,295, filed Jan. 10, 2020 (Part 2) 466 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement dated Jan. 29, 2021—Ex. 1011.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Amended Preliminary Infringement Contentions, dated Jun. 23, 2021, 241 pages—Ex. 1012.
*Lynk Labs, Inc.*, v. *Home Depot USA, Inc., The Home Depot Inc., and Home Depot Product Authority, LLC*, Case No. 6:21-cv-00097-ADA, Scheduling Order filed Aug. 13, 2021, 4 pages—Ex. 1013.
U.S. Appl. No. 61/217,215, filed May 28, 2009, 32 pages—Ex. 1014.
U.S. Appl. No. 60/997,771, filed Oct. 6, 2007, 24 pages—Ex. 1015.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783, and 10,932,341 filed Oct. 6, 2021, 38 pages—Ex. 1021.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Responsive Claim Construction Brief filed Oct. 27, 2021, 47 pages—Ex. 1022.
Application Multi-Voltage and Multi-Brightness LED Lighting Devices and Methods of Using Same, Remarks filed Jun. 13, 2019 12 pages—Ex. 1023.
U.S. Appl. No. 15/369,218 Non-Final Office Action dated Oct. 2, 2018—Ex. 1024.
Response to Office Action U.S. Appl. No. 16/440,884, filed Aug. 22, 2019, 11 pages—Ex. 1026.
IEEE 100 The Authoritative Dictionary of IEEE Standards Terms Seventh Edition, Published by Standards Information Network IEEE Press, 3 pages—Ex. 1028.
Response to Office Action U.S. Appl. No. 16/440,884, filed Jun. 16, 2020, 8 pages—Ex. 1029.
*Home Depot USA, Inc.*, v. *Lynk Labs, Inc.*, Case PGR2022-00009, U.S. Pat. No. 10,932,341, Patent Owner's Mandatory Notices Pursuant to 37 C.F.R. Section 42.8 dated Nov. 19, 2021, 5 pages.
*Home Depot USA, Inc.*, v. *Lynk Labs, Inc.*, Case PGR2022-00009, U.S. Pat. No. 10,932,341, Issue Date Feb. 23, 2021, Petitioner's Power of Attorney dated Nov. 5, 2021, 2 pages.
*Home Depot USA, Inc.*, v. *Lynk Labs, Inc.*, U.S. Pat. No. 10,932,341, Filing Date: Jan. 10, 2020, Issue Date: Feb. 23, 2021, IPR 2022-00143, Petition for Inter Partes Review of U.S. Pat. No. 10,932,341 dated Nov. 24, 2021, 81 pages.
*Samsung Electronics Co., Ltd.* v. *Lynk Labs, Inc.* U.S. Pat. No. 10,492,251 Petition for Inter Partes Review of U.S. Pat. No. 10,492,251, 95 pages.
*Samsung Electronics Co., Ltd.* v. *Lynk Labs, Inc.* U.S. Pat. No. 10,492,251 Power of Attorney for Petitioner Samsung Electronics Co., Ltd. 3 pages.
*Samsung Electronics Co., Ltd.* v. *Lynk Labs, Inc.* U.S. Pat. No. 10,492,251 Petitioner's Notice Regarding Multiple Petitions, 9 pages.
*Samsung Electronics Co., Ltd.* v. *Lynk Labs, Inc.* Case: IPR2022-00051, U.S. Pat. No. 10,492,251 Patent Owner's Mandatory Notices Pursuant to 37 C.F.R. Section 42.8, 5 pages.
*Samsung Electronics Co., Ltd.* v. *Lynk Labs, Inc.* U.S. Pat. No. 10,492,251 Declaration of R. Jacob Baker, Ph.D., P.E. in Support of Petition for Inter Partes Review of U.S. Pat. No. 10,492,251, 173 pages—Ex. 1002.
U.S. Appl. No. 16/148,945, filed Feb. 15, 2019, 309 pages—Ex. 1004.
U.S. Appl. No. 61/331,225, filed May 4, 2010, 63 pages—Ex. 1010.
Watson Mastering Electronics, Third Edition, pp. 1-151—Ex. 1012 and Ex. 1018.
Stan Gibilisco, Handbook of Radio & Wireless Technology, pp. 1-188—Ex. 1013.
Defendant Lynk Labs, Inc.'s Response to Plaintiffs' Initial Non-Infringement, Unenforceability, and Invalidity Contentions, 51 pages—Ex. 1038.
File History for U.S. Pat. No. 9,198,237 Issued May 18, 2011—Part 2, 321 pages—Ex. 1039.

(56) References Cited

OTHER PUBLICATIONS

Bedra/Smith, "Microelectronic Circuits," Fourth Edition, Part 1 of 4, pp. 1-161—Ex. 1041, Ex. 1061, ex, 1054.
Tim Williams, The Circuit Designer's Companion, First Published 1991, ISBN 0 7506 1142 1, 314 pages—Ex. 1042, Ex. 1094.
PCT File History US/2011/36359, filed May 12, 2011—Ex. 1050.
PCT File History US/2010/62235, filed Dec. 28, 2010—Ex. 1052, Ex. 1039.
U.S. Provisional Application filed May 12, 2010—Ex. 1063.
U.S. Provisional Application filed Dec. 28, 2009—Ex. 1064.
U.S. Provisional Application filed Dec. 31, 2009—Ex. 1065.
U.S. Appl. No. 60/547,653, filed Feb. 25, 2004—Ex. 1067.
U.S. Appl. No. 60/559,867, filed Feb. 25, 2004—Ex. 1068.
Civil Docket for Case# 6:21-cv-02665, Northern District of Illinois, Samsung Electronics. Co., Ltd., filed May 17, 2021, 14 pages—Ex. 1076, Ex. 1061.
Civil Docket for Case# 6:21-cv-00097-ADA, Western District of Texas (Waco)—Lynk Labs, Inc. filed Jan. 29, 2001, 9 pages—Ex. 1077, Ex. 1074.
US District Court for the Northern District of Illinois, Estimated Patent Case Schedule, 2 pages—Ex. 1079, Ex. 1062.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1080, Ex. 1075.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1082, Ex. 1071.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1083, Ex. 1066.
U.S. Pat. No. 10,492,251 ("the '251 Patent") Exemplary Infringement Contention Claim Charts, Appendix A-1 through J-1—Ex. 1084.
*Samsung Electronics Co., Ltd. et al.* v. *Lynk Labs, Inc.* Case No. 1:21-cv-02665, Notification of Docket Entry Jul. 27, 2021, 1 page—Ex. 1085, Ex. 1068.
*Samsung Electronics Co., Ltd., and Samsung Electronics America, Inc.* v. *Lynk Labs, Inc.*, No. 21 C 2665, Order dated Aug. 19, 2021—Ex. 1086.
*Samsung Electronics Co., Ltd. et al.* v. *Lynk Labs, Inc.* Case No. 1:21-cv-02665, Notification of Docket Entry Oct. 18, 2021, 1 page—Ex. 1087, Ex. 1070.
*Lynk Labs, Inc.*, v. *Home Dept USA, Inc., The Home Depot Inc., and Home Depot Product Authority, LLC*, Case. No. 6:21-cv-00097, Complaint for Patent Infringement dated Jan. 29, 2021, 88 page—Ex. 1088, Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint for Patent Infringement dated Mar. 17, 2021, 94 pages—Ex. 1089, Ex. 1073.
*Samsung Electronics Co., Ltd. et al.* v. *Lynk Labs, Inc.* Case IPR2022-00051, U.S. Pat. No. 10,492,251 Notice of Filing Date Accorded to Petition, mailed Dec. 9, 2021, 5 pages.
*Home Depot USA, Inc.*, v. *Lynk Labs, Inc.* Case IPR2021-01540, U.S. Pat. No. 10,091,842—Declaration of Dr. Lebby; Issue Date Oct. 2, 2018—158 pages—Ex. 1002.
U.S. Appl. No. 15/334,029, filed Oct. 25, 2016—646 pages—Ex. 1003.
*Lynk Labs, Inc.* v. *Home Depot USA, Inc., The Home Depot Inc. and Home Depot Product Authority, LLC*, Case No. 6:21-cv-00097-ADA, Complaint for Patent Infringement filed Jan. 29, 2021—88 pages—Ex. 1004.
*Lynk Labs, Inc.* v. *Home Depot USA, Inc., The Home Depot Inc. and Home Depot Product Authority, LLC*, Case No. 6:21-cv-00097-ADA, Scheduling Order filed Aug. 13, 2021—4 pages—Ex. 1006.
Signalized Intersection Safety in Europe, Dec. 2003, Publication No. FHWA-PL-02-020, Office of International Programs; International @fhwa.dot.gov; www.international.fhwa.dot.gov—126 pages—Ex. 1010.
Ohno et al., "Traffic Light Queues with Departure Headway Depending Upon Positions," Kyoto University, J. Operations Research So. of Japan, vol. 17, No. 3, Sep. 1974—pp. 146-169—Ex. 1011.
U.S. Appl. No. 61/333,963, filed May 12, 2010—52 pages—Ex. 1021.
U.S. Appl. No. 61/284,927, filed Dec. 28, 2009—26 pages—Ex. 1022.
U.S. Appl. No. 61/335,069, filed Dec. 31, 2009—36 pages—Ex. 1023.
U.S. Appl. No. 60/997,771, filed Oct. 6, 2007—24 pages—Ex. 1024.
U.S. Appl. No. 60/547,653, filed Feb. 25, 2004—83 pages—Ex. 1025.
U.S. Appl. No. 60/559,867, filed Feb. 25, 2004—89 pages—Ex. 1026.
U.S. Appl. No. 61/217,215, filed May 28, 2009—32 pages—Ex. 1027.
U.S. Appl. No. 61/215,144 filed May 1, 2009—11 pages—Ex. 1028.
E. Fred Schubert, "Light Emitting Diodes," Rensselaer Polytechnic Institute, Cambridge University Press, 2002—327 page—Ex. 1030.
IEEE 100 The Authoritative Dictionary of IEEE Standards Terms, Seventh Edition—4 pages—Ex. 1032.
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 264 pages—Ex. 1005 (excerpts).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 100 pages—Ex. 1012 (Part 1).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 2).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 3).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 142 pages—Ex. 1012 (Part 4).
*Home Depot USA, Inc.*, v. *Lynk Labs, Inc.*, Case No. IPR2021-01540, U.S. Pat No. 10,091,842, Petition for Inter Partes Review, Issue Date Oct. 2, 2018—74 pages.
*Home Depot USA, Inc.*, v. *Lynk Labs, Inc.*, Case No. IPR2021-01540, U.S. Pat. No. 10,091,842, Notice of Filing Date Accorded to Petition and Time for Filing Patent Owner Preliminary Response—mailed Oct. 15, 2021—6 pages.
*Home Depot USA, Inc.*, v. *Lynk Labs, Inc.*, Case No. IPR2021-01540, U.S. Pat. No. 10,091,842, Petitioner's Power of Attorney, Issue Date Oct. 2, 2018—2 pages.
*Home Depot USA, Inc.*, v. *Lynk Labs, Inc.*, Case No. IPR2021-01540, U.S. Pat. No. 10,091,842, Patent Owner's Mandatory Notices Pursuant to 37 C.F.R. Section 42.8 filed Oct. 22, 2021—6 pages.
*Home Depot USA, Inc.*, v. *Lynk Labs, Inc.*, Case No. IPR2021-01541, U.S. Pat. No. 10,537,001, Declaration of Dr. Dena Neikirk, Filing Date Feb. 12, 2019, Issue Date Jan. 14, 2020.
U.S. Appl. No. 16/274,164, filed Feb. 12, 2019—543 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement Case dated Jan. 29, 2021—88 pages—Ex. 1011.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251,

(56) References Cited

OTHER PUBLICATIONS 10,517,149, 10,537,001, 10,562,979, 10,757,783, and 10,932,341 filed Oct. 6, 2021—38 pages—Ex. 1019.
Response to Final Office Action U.S. Appl. No. 15/369,218, filed Jun. 13, 2018, 10 pages—Ex. 1020.
Non-Final Office Action U.S. Appl. No. 156/369,218 dated Oct. 2, 2018, 11 pages—Ex. 1021.
Non-Final Office Action U.S. Appl. No. 16/440,884 dated Jul. 23, 2019, 10 pages—Ex. 1023.
Continuation U.S. Appl. No. 16/369,218—original claims—Ex. 1024.
Response to Office Action U.S. Appl. No. 16/440,884, 11 pages—Ex. 1026.
*Home Depot USA, Inc.*, v. *Lynk Labs, Inc.*, Case No. IPR2021-01541, Filing Date Feb. 12, 2019, Issue Date Jan. 14, 2020, Petition for Inter Partes Review of U.S. Pat. No. 10,537,001 Under 35 U.S.C. Section 311-319 and 37 C.F.R. Section 42.1-100, Et Seq., 82 pages.
*Home Depot USA, Inc.*, v. *Lynk Labs, Inc.*, Case No. IPR2021-01541, U.S. Pat. No. 10,537,001, Petitioner's Power of Attorney, Issue Date Jan. 14, 2020—2 pages.
*Home Depot USA, Inc.*, v. *Lynk Labs, Inc.*, Case No. IPR2021-01541, U.S. Pat. No. 10,537,001, Patent Owner's Mandatory Notices Pursuant to 37 C.F.R. Section 42.8 filed Nov. 10, 2021—6 pages.
U.S. Pat. No. 11,019,697 ('697 Patent)—Exhibit I-08—iPAQ H5500.
*Samsung Electronics Co., Ltd.* v. *Lynk Labs, Inc.* U.S. Pat. No. 10,750,583, Petition for Inter Partes Review of U.S. Pat. No. 10,750,583 dated Oct. 28, 2021—79 pages.
*Samsung Electronics Co., Ltd.* v. *Lynk Labs, Inc.* U.S. Pat. No. 10,750,583, Power of Attorney for Petitioner Samsung Electronics Co., Ltd.,—3 pages.
*Samsung Electronics Co., Ltd.* v. *Lynk Labs, Inc.* U.S. Pat. No. 10,750,583, Petitioner's Notice Regarding Multiple Petitions—8 pages.
*Samsung Electronics Co., Ltd.* v. *Lynk Labs, Inc.* Case: IPR2022-00100, U.S. Pat. No. 10,750,583, Patent Owner's Mandatory Notices Pursuant to 37 C.F.R Section 42.8—5 pages.
*Samsung Electronics Co., Ltd.* v. *Lynk Labs, Inc.* U.S. Pat. No. 10,750,583, Declaration of R. Jacob Baker, Ph.D., P.E. in Support of Petition for Inter Partes Review of U.S. Pat. No. 10,750,583 Ex. 1002.
U.S. Appl. No. 16/449,273, filed Jun. 21, 2019 Ex. 1004.
Sedra/Smith, "Microelectronic Circuits," Fourth Edition, Parts 1-4, pp.—Exs. 1041, 1061, 1054, 1034.
Watson Mastering Electronics, Third Edition, pp. 1-151—Exs. 1012, 1018, 1031.
Tim Williams, The Circuit Designer's Companion, First Published 1991, ISBN 0 7506 1142 1, 314 pages—Ex. 1042, 1094.
Chamber Dictionary of Science and Technology, General Editor Professor Peter MB Walker, CBE, FRSE, Chambers Harrap Published Ltd. 1999 ISBN 0 550 14110 3, 4 pages—Ex. 1047, 1024.
McGraw-Hill Dictionary of Scientific and Technical Terms, Sixth Edition, Library of Congress Cataloging in Publication Data , Isbn 0-07-042313-X, pp. 4—Ex. 1048, 1018.
U.S. Appl. No. 61/333,963, filed May 12, 2010 Ex. 1063.
"Supplemental Report of Parties' Planning Meeting", from *Samsung Electronics Co. Ltd. et al* v. *Lynk Labs, Inc.*, Case No. 1:21-cv-02665, filed Oct. 14, 2021—11 pages Ex. 1075, Ex. 1080.
Docket from *Samsung Electronics Co. Ltd. et al* v. *Lynk Labs, Inc.*, Case No. 1:21-cv-02665 printed Oct. 25, 2021—14 pages Ex. 1076, Ex. 1061.
U.S. Pat. No. 10,750,583 Exemplary Infringement Chart Samsung SmartThings Hub (as Appendix J-2)—11 pages Ex. 1084.
"Order" as scheduling order from *Samsung Electronics Co. Ltd. et al* v. *Lynk Labs, Inc.*, Case No. 1:21-cv-02665, filed Aug. 19, 2021—2 pages Ex. 1086.
"Notification of Docket Entry" from *Samsung Electronics Co. Ltd. et al* v. *Lynk Labs, Inc.*, Case No. 1:21-cv-02665, filed Oct. 18, 2021—1 page Ex. 1087, Ex. 1070.
U.S. Pat. No. 10,091,842 ("'842 Patent")—Exhibit G-01 Bruning.
U.S. Pat. No. 10,091,842 ("'842 Patent")—Exhibit G-02 Ohishi '319.
U.S. Pat. No. 10,091,842 ("'842 Patent")—Exhibit G-03 Ruxton.
U.S. Pat. No. 10,091,842 ("'842 Patent")—Exhibit G-04 Walding.
U.S. Pat. No. 10,091,842 ("'842 Patent")—Exhibit G-05 Bohn.
U.S. Pat. No. 10,091,842 ("'842 Patent")—Exhibit G-06 Dowling.
U.S. Pat. No. 10,537,001 ("'001 Patent")—Exhibit H-01 Dowling.
U.S. Pat. No. 10,537,001 ("'001 Patent")—Exhibit H-02 Lys '321.
U.S. Pat. No. 10,537,001 ("'001 Patent")—Exhibit H-03 Miskin.
U.S. Pat. No. 10,537,001 ("'001 Patent")—Exhibit H-04 Leong '003.
U.S. Pat. No. 10,537,001 ("'001 Patent")—Exhibit H-05 Konno.
U.S. Pat. No. 10,932,341 ("'341 Patent")—Exhibit I-01 Ohishi '009.
U.S. Pat. No. 10,932,341 ("'341 Patent")—Exhibit I-02 Muthu '558.
U.S. Pat. No. 10,932,341 ("'341 Patent")—Exhibit I-03 Dowling.
U.S. Pat. No. 10,932,341 ("'341 Patent")—Exhibit I-04 Konno.
U.S. Pat. No. 10,932,341 ("'341 Patent")—Exhibit I-05 Leong '003.
U.S. Pat. No. 10,932,341 ("'341 Patent")—Exhibit I-06 Reymond.
"White Light Emitting Diode Development for General Illumination Applications" to James Ibbetson, published on May 1, 2006 ("Ibbetson").
*Lynk Labs, Inc.*, v. *Home Depot USA, Inc. The Home Dept Inc., and Home Depot Product Authority, LLC*, Case No. 6:21-cv-00097-ADA, Home Depot's Preliminary Invalidity Contentions and Additional Disclosure Pursuant to Scheduling Order dated Aug. 18, 2021—22 pages.
U.S. Pat. No. 10,492,251 ('251 Patent)—Exhibit A-01—Takeo '301.
U.S. Pat. No. 10,492,251 ('251 Patent)—Exhibit A-02—Lynam '623.
U.S. Pat. No. 10,492,251 ('251 Patent)—Exhibit A-03—Filipovsky '319.
U.S. Pat. No. 10,492,251 ('251 Patent)—Exhibit A-04 Deese '719.
U.S. Pat. No. 10,492,251 ('251 Patent)—Exhibit A-05 Okuno.
U.S. Pat. No. 10,492,251 ('251 Patent)—Exhibit A-06—Ohishi '319.
U.S. Pat. No. 10,492,251 ('251 Patent)—Exhibit A-07 Teshima.
U.S. Pat. No. 10,349,479 ("'479 Patent")—Exhibit B-01 Dowling.
U.S. Pat. No. 10,349,479 ("'479 Patent")—B-02 Ter Weeme.
U.S. Pat. No. 10,349,479 ("'479 Patent")—Exhibit B-03 Lin.
U.S. Pat. No. 10,349,479 ("'479 Patent")—Exhibit B-04 Lys '483.
U.S. Pat. No. 10,349,479 ("'479 Patent")—Exhibit B-05 Leong '814.
U.S. Pat. No. 10,349,479 ("'479 Patent")—Exhibit B-06 Calon.
U.S. Pat. No. 10,349,479 ("'479 Patent")—Exhibit B-07 Nakagawara.
U.S. Pat. No. 10,757,783 ("'783 Patent")—Exhibit C-01 Grajcar.
U.S. Pat. No. 10,757,783 ("'783 Patent")—Exhibit C-02 Reymond.
U.S. Pat. No. 10,757,783 ("'783 Patent")—Exhibit C-03 Walter.
U.S. Pat. No. 10,757,783 ("'783 Patent")—Exhibit C-04 Lyos '901.
U.S. Pat. No. 10,757,783 ("'783 Patent")—Exhibit C-05 Hair.
U.S. Pat. No. 10,757,783 ("'783 Patent")—Exhibit C-06 Cho.
U.S. Pat. No. 10,757,783 ("'783 Patent")—Exhibit C-07 Coleman.
U.S. Pat. No. 10,757,783 ("'783 Patent")—Exhibit C-08 Shimizu.
U.S. Pat. No. 10,154,551 ("'551 Patent")—Exhibit D-01 Saito.
U.S. Pat. No. 10,154,551 ("'551 Patent")—Exhibit D-02 Hochstein '168.
U.S. Pat. No. 10,154,551 ("'551 Patent")—Exhibit D-03 Reymond.
U.S. Pat. No. 10,154,551 ("'551 Patent")—Exhibit D-04 Panagotacos.
U.S. Pat. No. 10,154,551 ("'551 Patent")—Exhibit D-05 Liu.
U.S. Pat. No. 10,154,551 ("'551 Patent")—Exhibit D-06 Deese 450.
U.S. Pat. No. 10,154,551 ("'551 Patent")—Exhibit D-07 Lys.
U.S. Pat. No. 10,154,551 ("'551 Patent")—Exhibit D-08 Shimizu.
U.S. Pat. No. 10,517,149 ("'149 Patent")—Exhibit E-01 Takahashi.
U.S. Pat. No. 10,517,149 ("'149 Patent")—Exhibit E-02 Saito '590.
U.S. Pat. No. 10,517,149 ("'149 Patent")—Exhibit E-03 Lys '399.
U.S. Pat. No. 10,517,149 ("'149 Patent")—Exhibit E-04 Catalano '081.
U.S. Pat. No. 10,517,149 ("'149 Patent")—Exhibit E-05 Deese 719.
U.S. Pat. No. 10,652,979 ("'979 Patent")—Exhibit F-01 Coats '555.

(56) References Cited

OTHER PUBLICATIONS

U.S. Pat. No. 10,652,979 ("'979 Patent")—Exhibit F-02 Birrell '406.
U.S. Pat. No. 10,652,979 ("'979 Patent")—Exhibit F-03 Muthu '159.
U.S. Pat. No. 10,652,979 ("'979 Patent")—Exhibit F-04 Teshima '408.
U.S. Pat. No. 10,652,979 ("'979 Patent")—Exhibit F-05 Takeo.
U.S. Pat. No. 10,652,979 ("'979 Patent")—Exhibit F-06 Deese '719.
U.S. Appl. No. 60/839,453, filed Aug. 23, 2006, entitled "Lighting Device and Lighting Method" to Van de Ven and Negley, ("453 Provisional").
U.S. Appl. No. 60/793,524, filed Apr. 20, 2006, entitled "Lighting Device and Lighting Method" to Van de Ven and Negley, ("524 Provisional").
U.S. Appl. No. 60/844,325, filed Sep. 13, 2006, entitled "Boost/Flyback Power Supply Topology With Low Side Mosfet Current Control" to Myers ("Myers").
Interim LED Purchase Specifications of the Institute of Transportation Engineers, Jul. 1998 ("1998 Specification").
"Comparison of Control Options in Private Offices in an Advanced Lighting Controls Testbed," by Judith D. Jennings et al., and published in Apr. 1999 ("Jennings").
Vehicle Detection Using a Magetic Field Sensor, by Stanely V. Marshall, and published in May 1978 ("Marshall").
Petition for Inter Partes Review, *Home Depot USA, Inc.*, Petitioner, v. *Lynk Labs, Inc.*, Patent Owner, Case PR2021-001367 U.S. Pat. No. 10, 154,551, Issue Date Dec. 11, 2018, Title: "AC Light Emitting Diode and AC LED Drive Methods and Apparatus," 93 pages dated Aug. 18, 2021.
Petitioners' Power of Attorney, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 2 pages dated Aug. 17, 2021.
Declaration of Dr. Dean Neikirk—U.S. Pat No. 10,154,551, Claims 1, 3, 4, 5, 7, 8—141 pages—Ex 1002.
U.S. Appl. No. 15/797,806—Now U.S. Pat. No. 10,154,551—Ex 1003.
U.S. Appl. No. 11/066,414—Now U.S. Pat. No. 7,489,086 issued Feb. 10, 2009—Ex 1005.
IEEE 100, The Authoritative Dictionary of IEEE Standards Terms—Seventh Edition, 3 pages—Ex 1010.
Complaint for Patent Infringement *Lynk Labs, Inc.* Plaintiff v. *Home Depot USA, Inc., The Home Depot Inc., and Home Depot Product Authority, LLC* Defendants, Case No. 6:21-cv-00097, filed Jan. 20, 2021—Ex. 1011.
Azazi et al., "Review of Passive and Active Circuits for Power Factor Correction in Single Phase, Low Power AC-DC Converters," Proceedings of the 14th International Middle East Power Systems Conference (MEPCON'10) Cairo University, Egypt, Dec. 19-21, 2010, Paper ID 154, 8 pages—Ex 1016.
U.S. Appl. No. 60/547,653, filed Feb. 25, 2004—Ex 1017.
U.S. Appl. No. 60/559,867, filed Feb. 25, 2004—Ex 1018.
U.S. Appl. No. 60/997,771, filed Oct. 6, 2007—Ex 1019.
U.S. Appl. No. 61/215,144, filed May 1, 2009—Ex 1022.
U.S. Appl. No. 61/217,215, filed May 28, 2009—Ex 1023.
U.S. Appl. No. 61/284,927, filed Dec. 28, 2009—Ex 1024.
U.S. Appl. No. 61/335,069, filed Dec. 31, 2009—Ex 1025.
U.S. Appl. No. 61/333,963, filed May 12, 2010—Ex 1026.
Plaintiff Lynk Labs, Inc.'s Amended Preliminary Infringement Contentions, Case No. 6:21-cv-00097-ADA filed Jun. 23, 2021, 7 pages—Ex 1034.
U.S. Appl. No. 60/379,079, filed May 9, 2002—Ex 1035.
U.S. Appl. No. 60/391,627, filed Jun. 26, 2002—Ex 1036.
Institute of Transportation Engineers Publication No. ST-017B, 1997 ISBN: 0-935403-16-7, ITE Specification (183369415.1), Chapter 2 Vehicle Traffic Control Signal Heads, 25 pages—Ex 1038.
Osorno, "Fourier Analysis of a Single-Phase Full Bridge Rectifier Using Matlab," California State University Northridge, 2002-774, 9 pages—Ex 1039.
Scheduling Order *Lynk Labs, Inc.* Plaintiff v. *Home Depot USA, Inc., The Home Depot Inc., and Home Depot Product Authority, LLC* Defendants, Case No. 6:21-cv-00097, filed Aug. 13, 2021—Ex. 1040.
Vachak et al., "Power Factor Correction Circuits: Active Filters," International Journal of Engineering Research and General Science, vol. 2, Issue 5, Aug.-Sep. 2014, ISSAN 2091-2730, 9 pages—Ex 1041.
*Samsung Electronics Co., Ltd. and Samsung Electronics America, Inc.* v. *Lynk Labs, Inc.*, Case No. 1:21-cv-02665, Samsung's Final Unenforcebility and Invalidity Contentions, dated Apr. 1, 2022—52 pages.
*Samsung Electronics Co., Ltd.*, Petitioner v. *Lynk Labs, Inc.* Patent Owner IPR 2022-00098 U.S. Pat. No. 10,517,149 B2 Judgment Final Written Decision Determining Some Challenged Claims Unpatentable 35 U.S.C Section 318(a) Paper 29 entered May 5, 2023 46 pages.
*Samsung Electronics Co., Ltd.*, Petitioner v. *Lynk Labs, Inc.* Patent Owner IPR 2022-00101, U.S. Pat. No. 10,750,583 B2 Judgment Final Written Decision Determining No Challenged Claims Unpatentable 35 U.S.C Section 318(a) Paper 30 entered May 25, 2023—34 pages.
*Samsung Electronics Co., Ltd.*, Petitioner v. *Lynk Labs, Inc.* Patent Owner IPR 2022-00100, U.S. Pat. No. 10,750,583 B2 Judgment Final Written Decision Determining All Challenged Claims Unpatentable 35 U.S.C Section 318(a) Paper 30 entered Jun. 7, 2023—42 pages.
*Samsung Electronics Co., Ltd.*, Petitioner v. *Lynk Labs, Inc.* Patent Owner IPR 2022-00051, U.S. Pat. No. 10,492,251 B2 Judgment Final Written Decision Determining All Challenged Claims Unpatentable 35 U.S.C Section 318(a) Paper 37 entered Jun. 2, 2023—22 pages.
*Home Depot U.S.A., Inc., Petitioner v. Lynk Labs, Inc.* Patent Owner PGR2022-00009, U.S. Pat. No. 10,932,341 B2 Judgment Final Written Decision Determining All Challenged Claims Unpatentable Paper 38 entered May 22, 2023—79 pages.
*Samsung Electronics Co., Ltd.*, Petitioner v. *Lynk Labs, Inc.* Patent Owner IPR2022-00052, U.S. Pat. No. 10,492,251 B2 Judgment Final Written Decision Determining All Challenged Claims Unpatentable 35 U.S.C.Section 318(a) Paper 38 entered Jun. 2, 2023—37 pages.
*Samsung Electronics Co., Ltd.*, Petitioner v. *Lynk Labs, Inc.*, Patent Owner IPR2022-00149, U.S. Pat. No. 10,687,400 B2 Judgment Final Written Decision Determining All Challenged Claims Unpatentable 35 U.S.C. Section 314(a) Paper 33 dated Jun. 26, 2023—70 pages.
*Samsung Electronics Co., Ltd.*, Petitioner v. *Lynk Labs, Inc.*, Patent Owner IPR2021-01575, U.S. Pat. No. 10,154,551 B2 Judgment Final Written Decision Determining All Challenged Claims Unpatentable 35 U.S.C. Section 318(a) Paper 38 dated May 10, 2023 - 42 pages.
Declaration of Dr. Dean Neikirk U.S. Pat. No. 11,297,705 PGR2023-00016—*Home Depot U.S.A., Inc.* v. *Lynk Labs, Inc.*—Part 1 87 Pages—Ex. 1002.
Declaration of Dr. Dean Neikirk U.S. Pat. No. 11,297,705 PGR2023-00016—*Home Depot U.S.A., Inc.* v. *Lynk Labs, Inc.*—Part 2 89 Pages—Ex. 1002.
IEEE 100 The Authoritative Dictionary of IEEE Standards Terms; Seventh Edition—PGR2023-00016 Home Depot 3 pages—Ex. 1028.
*Home Depot U.S.A., Inc.*, v. *Lynk Labs, Inc.* IPR2021-01370 U.S. Pat. No. 10,349,479 B2 Decision, Final Written Decision Determining All Challenged Claims Unpatentable 35U.S.C. Section 318 (a) entered Jan. 18, 2023.
*Home Depot U.S.A., Inc.*, v. *Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 1.

(56) References Cited

OTHER PUBLICATIONS

*Home Depot U.S.A., Inc.*, v. *Lynk Labs, Inc.* U.S. Pat. No. 11,297,705 Filing Date Feb. 22, 2021 Issue Date Apr. 5, 2022—PGR2023-00016, Petition for Post-Grant Review of U.S. Pat. No. 11,297,705 dated Jan. 5, 2023—Part 2.
*Samsung Electronics Co., Ltd.*, Petitioner v. *Lynk Labs, Inc.* Patent Owner IPR 2021-01347, U.S. Pat. No. 10,966,298 B2; Judgment Final Written Decision Determining All Challenged Claims Unpatentable 35 USC Section 318(a) dated Mar. 13, 2023 Paper 27—57 pages.
*Samsung Electronics Co., Ltd.*, Petitioner v. *Lynk Labs, Inc.* Patent Owner IPR 2021-01345, U.S. Pat. No. 10,492,252 B2; Decision Final Written Decision Determining All Challenged Claims Unpatentable 35 USC Section 318(a) dated Mar. 15, 2023 Paper 28—50 pages.
*Samsung Electronics Co., Ltd.*, Petitioner v. *Lynk Labs, Inc.* Patent Owner IPR 2021-01346, U.S. Pat. No. 10,499,466 B1; Decision Final Written Decision Determining All Challenged Claims Unpatentable 35 USC Section 318(a) dated Mar. 15, 2023 Paper 29—64 pages.
*Samsung Electronics Co., Ltd.*, Petitioner v. *Lynk Labs, Inc.* Patent Owner IPR 2021-01576, U.S. Pat. No. 10,652,979 B2; Judgment Final Written Decision Determining All Challenged Claims Unpatentable 35 USC Section 318(a) dated Apr. 19, 2023 Paper 34—57 pages.
*Samsung Electronics Co., Ltd.*, Petitioner v. *Lynk Labs, Inc.* Patent Owner IPR 2021-01300, U.S. Pat. No. 11,019,697 B2; Judgment Final Written Decision Determining All Challenged Claims Unpatentable 35 USC Section 318(a) dated Mar. 13, 2023 Paper 35—54 pages.
*Home Depot USA, Inc.*, Petitioner v. *Lynk Labs, Inc.* Patent Owner IPR 2021-01540, U.S. Pat. No. 10,091,842 B2; Judgment Final Written Decision Determining All Challenged Claims Unpatentable 35 USC Section 318(a) dated Mar. 29, 2023 Paper 46—31 pages.
*Home Depot USA, Inc.*, Petitioner v. *Lynk Labs, Inc.* Patent Owner IPR 2021-01541, U.S. Pat. No. 10,537,001 B2; Judgment Final Written Decision Determining All Challenged Claims Unpatentable 35 USC Section 318(a) dated Apr. 26, 2023 Paper 39—40 pages.
*Home Depot USA, Inc.*, Petitioner v. *Lynk Labs, Inc.* Patent Owner IPR 2022-00023, U.S. Pat. No. 10,517,149 B2; Judgment Final Written Decision Determining Some Challenged Claims Unpatentable 35 USC Section 318(a) dated May 5, 2023 Paper 40—55 pages.
*Samsung Electronics Co., Ltd.*, Petitioner v. *Lynk Labs, Inc.* Patent Owner IPR 2022-00098, U.S. Pat. No. 10,517,149 B2 Judgment Final Written Decision Determining Some Challenged Claims Unpatentable 35 USC Section 318(a) dated May 5, 2023 Paper 29—46 pages.
*Samsung Electronics Co., Ltd.*, Petitioner v. *Lynk Labs, Inc.* Patent Owner IPR 2021-01575, U.S. Pat. No. 10,154,551 B2 Judgment Final Written Decision Determining All Challenged Claims Unpatentable 35 USC Section 318(a) dated May 10, 2023 Paper 38—42 pages.
*Home Depot U.S.A., Inc.*, v. *Lynk Labs, Inc.* IPR2021-01367 U.S. Pat. No. 10,154,551 B2 Judgment, Final Written Decision Determining All Challenged Claims Unpatentable 35U.S.C. Section 318 (a) entered Feb. 14, 2023—30 pages.
*Home Depot U.S.A., Inc.*, v. *Lynk Labs, Inc.* IPR2021-01368 U.S. Pat. No. 10,757,783 B2 Decision, Final Written Decision Determining All Challenged Claims Unpatentable 35U.S.C. Section 318 (a) entered Jan. 27, 2023—36 pages.
*Home Depot U.S.A., Inc.*, v. *Lynk Labs, Inc.* IPR2021-01369 U.S. Pat. No. 10,492,251 B2 Judgment, Final Written Decision Determining All Challenged Claims Unpatentable 35U.S.C. Section 318 (a) entered Feb. 14, 2023—36 pages.
*Home Depot U.S.A., Inc.*, v. *Lynk Labs, Inc.* IPR2021-01370 U.S. Pat. No. 10,349,479 B2 Decision, Final Written Decision Determining All Challenged Claims Unpatentable 35 U.S.C. Section 318 (a) entered Jan. 18, 2023, Paper 46—60 pages.
*Samsung Electronics Co., Ltd.*, v. *Lynk Labs, Inc.* IPR2021-01299 U.S. Pat. No. 10,506,674 B2 Decision, Final Written Decision Determining All Challenged Claims Unpatentable 35U.S.C. Section 318 (a) entered Mar. 7, 2023—58 pages.
U.S. Pat. No. 10,966,298 ('298 Patent)—Exhibit H-06—Mac Powerbook G3.
U.S. Pat. No. 10,966,298 ('298 Patent)—Exhibit H-07—iPod G3.
U.S. Pat. No. 10,966,298 ('298 Patent)—Exhibit H-08—iPAQ H5500.
U.S. Pat. No. 11,019,697 ('697 Patent)—Exhibit I-01—Piepgrass.
U.S. Pat. No. 11,019,697 ('697 Patent)—Exhibit I-02—Hitachi.
U.S. Pat. No. 11,019,697 ('697 Patent)—Exhibit I-03—Mueller.
U.S. Pat. No. 11,019,697 ('697 Patent)—Exhibit I-04—NEC.
U.S. Pat. No. 11,019,697 ('697 Patent)—Exhibit I-05—Miskin '299.
U.S. Pat. No. 11,019,697 ('697 Patent)—Exhibit I-06—Mac Powerbook G3.
U.S. Pat. No. 11,019,697 ('697 Patent)—Exhibit I-07—iPod G3.
U.S. Pat. No. 11,019,697 ('697 Patent)—Exhibit 1-08—iPAQ H5500.
Macintosh PowerBook G3, 1999.
Apple iPod Third Generation User's Guide, released Apr. 29, 2003.
"HP iPAQ Pocket PC H5500," GadgetSpeak, published Nov. 6, 2003.
Light-Emitting Diodes by E. Fred Schubert, published in 2003 ("Schubert").
Fundamentals of LED Drivers by A. Hernandez et al., published in 2003 ("Hernandez").
Color System by Kinetics iColor MR Data Sheet.
WDS Wireless Dimming System Operator's Manual published in 2003 ("WDS-Manual").
AND8137/D—High Current LED—Isolated Low Voltage AC Drive—Application Note by Carl Walding, published in Oct. 2003 ("AND8137/D").
Characteristics of high-efficient InGaN-based white LED lighting by Yuji Uchida, published in 2011 ("Uchida").
*Lynk Labs, Inc.* v. *Home Depot USA, Inc. The Home Depot, Inc., and Home Depot Product Authority, LLC*, Case No. 6:21-cv-00097-ADA, Defendants' Corrected Reply Claim Construction Brief on the Terms of U.S. Pat. Nos. 10,091,842, 10,154,551, 10,349,479, 10,492,251, 10,517,149, 10,537,001, 10,652,979, 10,757,783, and 10,932,341 filed Nov. 10, 2021—60 pages.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 1.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 2.

* cited by examiner

MULTI-VOLTAGE AND MULTI-BRIGHTNESS LED LIGHTING DEVICES AND METHODS OF USING SAME

RELATED APPLICATIONS

The present application is a continuation of U.S. patent application Ser. No. 17/181,802, filed Feb. 22, 2021, which is a continuation of U.S. patent application Ser. No. 16/740,295, filed Jan. 10, 2020, which is a continuation of U.S. patent application Ser. No. 16/274,164, filed Feb. 12, 2019, which is a continuation of U.S. patent application Ser. No. 15/685,429, filed Aug. 24, 2017, which is a continuation of U.S. patent application Ser. No. 14/172,644, filed Feb. 4, 2014, which is a continuation of U.S. patent application Ser. No. 13/322,796, filed Nov. 28, 2011, which is a national phase application of International Application No. PCT/US2010/001597, filed May 28, 2010, which claims priority to U.S. Provisional Application No. 61/217,215, filed May 28, 2009, and is a continuation-in-part of U.S. patent application Ser. No. 12/287,267, filed Oct. 6, 2008, which claims the priority to U.S. Provisional Application No. 60/997,771, filed Oct. 6, 2007; the contents of each of these applications are expressly incorporated herein by reference.

TECHNICAL FIELD

The present invention generally relates to light emitting diodes ("LEDs") for AC operation. The present invention specifically relates to multiple voltage level and multiple brightness level LED devices, packages and lamps.

FEDERALLY SPONSORED RESEARCH OR DEVELOPMENT

None.

BACKGROUND OF THE INVENTION

Field of the Invention

The present invention generally relates to light emitting diodes ("LEDs") for multi-voltage level and/or multi-brightness level operation. The present invention specifically relates to multiple voltage level and multiple brightness level light emitting diode circuits, single chips, packages and lamps "devices" for direct AC voltage power source operation, bridge rectified AC voltage power source operation or constant DC voltage power source operation.

Description of the Related Art

LEDs are semiconductor devices that produce light when a current is supplied to them. LEDs are intrinsically DC devices that only pass current in one polarity and historically have been driven by DC voltage sources using resistors, current regulators and voltage regulators to limit the voltage and current delivered to the LED. Some LEDs have resistors built into the LED package providing a higher voltage LED typically driven with 5V DC or 12V DC.

With proper design considerations LEDs may be driven more efficiently with direct AC or rectified AC than with constant voltage or constant current DC drive schemes.

Some standard AC voltage in the world include 12 VAC, 24 VAC, 100 VAC, 110 VAC, 120 VAC, 220 VAC, 230 VAC, 240 VAC and 277 VAC. Therefore, it would be advantageous to have a single chip LED or multi-chip single LED packages that could be easily configured to operate at multiple voltages by simply selecting a voltage and/or current level when packaging the multi-voltage and/or multi-current single chip LEDs or by selecting a specific voltage and/or current level when integrating the LED package onto a printed circuit board or within a finished lighting product. It would also be advantageous to have multi-current LED chips and/or packages for LED lamp applications in order to provide a means of increasing brightness in LED lamps by switching in additional circuits just as additional filaments are switched in for standard incandescent lamps.

U.S. Pat. No. 7,525,248 discloses a chip-scale LED lamp including discrete LEDs capable of being built upon electrically insulative, electrically conductive, or electrically semi conductive substrates. Further, the construction of the LED lamp enables the lamp to be configured for high voltage AC or DC power operation. The LED based solid-state light emitting device or lamp is built upon an electrically insulating layer that has been formed onto a support surface of a substrate. Specifically, the insulating layer may be epitaxially grown onto the substrate, followed by an LED buildup of an n-type semiconductor layer, an optically active layer, and a p-type semiconductor layer, in succession. Isolated mesa structure of individual, discrete LEDs is formed by etching specific portions of the LED buildup down to the insulating layer, thereby forming trenches between adjacent LEDs. Thereafter, the individual LEDs are electrically coupled together through conductive elements or traces being deposited for connecting the n-type layer of one LED and the p-type layer of an adjacent LED, continuing across all of the LEDs to form the solid-state light emitting device. The device may therefore be formed as an integrated AC/DC light emitter with a positive and negative lead for supplied electrical power. For instance, the LED lamp may be configured for powering by high voltage DC power (e.g., 12V, 24V, etc.) or high voltage AC power (e.g., 110/120V, 220/240V, etc.).

U.S. Pat. No. 7,213,942 discloses a single-chip LED device through the use of integrated circuit technology, which can be used for standard high AC voltage (110 volts for North America, and 220 volts for Europe, Asia, etc.) operation. The single-chip AC LED device integrates many smaller LEDs, which are connected in series. The integration is done during the LED fabrication process and the final product is a single-chip device that can be plugged directly into house or building power outlets or directly screwed into incandescent lamp sockets that are powered by standard AC voltages. The series connected smaller LEDs are patterned by photolithography, etching (such as plasma dry etching), and metallization on a single chip. The electrical insulation between small LEDs within a single-chip is achieved by etching light emitting materials into the insulating substrate so that no light emitting material is present between small LEDs. The voltage crossing each one of the small LEDs is about the same as that in a conventional DC operating LED fabricated from the same type of material (e.g., about 3.5 volts for blue LEDs).

Accordingly, single chip LEDs have been limited and have not been integrated circuits beyond being fixed series or fixed parallel circuit configurations until the development of AC LEDs. The AC LEDs have still however been single circuit, fixed single voltage designs.

LED packages have historically not been integrated circuits beyond being fixed series or fixed parallel circuit configurations.

The art is deficient in that it does not provide a multi-voltage and/or multi-current circuit monolithically integrated on a single substrate which would be advantageous.

It would further be advantageous to have a multi-voltage and/or multi-brightness circuit that can provide options in voltage level, brightness level and/or AC or DC powering input power preference.

It would further be advantageous to provide multiple voltage level and/or multiple brightness level light emitting LED circuits, chips, packages and lamps "multi-voltage and/or multi-brightness LED devices" that can easily be electrically configured for at least two forward voltage drive levels with direct AC voltage coupling, bridge rectified AC voltage coupling or constant voltage DC power source coupling. This invention comprises circuits and devices that can be driven with more than one AC or DC forward voltage "multi-voltage" at 6V or greater based on a selectable desired operating voltage level that is achieved by electrically connecting the LED circuits in a series or parallel circuit configuration and/or more than one level of brightness "multi-brightness" based on a switching means that connects and/or disconnects at least one additional LED circuit to and/or from a first LED circuit. The desired operating voltage level and/or the desired brightness level electrical connection may be achieved and/or completed at the LED packaging level when the multi-voltage and/or multi-brightness circuits and/or single chips are integrated into the LED package, or the LED package may have external electrical contacts that match the integrated multi-voltage and/or multi-brightness circuits and/or single chips within, thus allowing the drive voltage level and/or the brightness level select-ability to be passed on through to the exterior of the LED package and allowing the voltage level or brightness level to be selected at the LED package user, or the PCB assembly facility, or the end product manufacturer.

It would further be advantageous to provide at least two integrated circuits having a forward voltage of at least 12 VAC or 12 VDC or greater on a single chip or within a single LED package that provide a means of selecting a forward voltage when packaging a multi-voltage and/or multi-brightness circuit using discrete die (one LED chip at a time) and wire bonding them into a circuit at the packaging level or when packaging one or more multi-voltage and/or multi-brightness level single chips within a LED package.

It would further be advantageous to provide multi-voltage and/or multi-brightness level devices that can provide electrical connection options for either AC or DC voltage operation at preset forward voltage levels of 6V or greater.

It would further be advantageous to provide multi-brightness LED devices that can be switched to different levels of brightness by simply switching additional circuits on or off in addition to a first operating circuit within a single chip and or LED package. This would allow LED lamps to switch to higher brightness levels just like 2-way or 3-way incandescent lamps do today.

The benefits of providing multi-voltage circuits of 6V or greater on a single chip is that an LED packager can use this single chip as a platform to offer more than one LED packaged product with a single chip that addresses multiple voltage levels for various end customer design requirements. This also increase production on a single product for the chip maker and improves inventory control. This also improves buying power and inventory control for the LED packager when using one chip.

The present invention provides for these advantages and solves the deficiencies in the art.

SUMMARY OF THE INVENTION

According to one aspect of the invention at least two single voltage AC LED circuits are formed on a single chip or on a substrate providing a multi-voltage AC LED device for direct AC power operation. Each single voltage AC LED circuit has at least two LEDs connected to each other in opposing parallel relation.

According to another aspect of the invention, each single voltage AC LED circuit is designed to be driven with a predetermined forward voltage of at least 6 VAC and preferably each single voltage AC LED circuit has a matching forward voltage of 6 VAC, 12 VAC, 24 VAC, 120 VAC, or other AC voltage levels for each single voltage AC LED circuit.

According to another aspect of the invention, each multi-voltage AC LED device would be able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. By way of example, the second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention, at least two single voltage series LED circuits, each of which have at least two serially connected LEDs, are formed on a single chip or on a substrate providing a multi-voltage AC or DC operable LED device.

According to another aspect of the invention, each single voltage series LED circuit is designed to be driven with a predetermined forward voltage of at least 6V AC or DC and preferably each single voltage series LED circuit has a matching forward voltage of 6V, 12V, 24V, 120V, or other AC or DC voltage levels. By way of example, each multi-voltage AC or DC LED device would be able to be driven with at least two different AC or DC forward voltages resulting in a first forward voltage drive level by electrically connecting the two single voltage series LED circuits in parallel and a second forward voltage drive level by electrically connecting the at least two single voltage level series LED circuits in series. The second forward voltage drive level of the serially connected series LED circuits would be approximately twice the level of the first forward voltage drive level of the parallel connected series LED circuits. The at least two parallel connected series LED circuits would be twice the current of the at least two serially connected series LED circuits. In either circuit configuration, the brightness would be approximately the same with either forward voltage drive selection of the multi-voltage series LED device.

According to another aspect of the invention, at least two single voltage AC LED circuits are formed on a single chip or on a substrate providing a multi-voltage and/or multi-brightness AC LED device for direct AC power operation.

According to another aspect of the invention, each single voltage AC LED circuit has at least two LEDs connected to each other in opposing parallel relation. Each single voltage AC LED circuit is designed to be driven with a predetermined forward voltage of at least 6 VAC and preferably each single voltage AC LED circuit has a matching forward voltage of 6 VAC, 12 VAC, 24 VAC, 120 VAC, or other AC voltage levels for each single voltage AC LED circuit. The at least two AC LED circuits within each multi-voltage and/or multi current AC LED device would be left able to be driven with at least two different AC forward voltages resulting in a first forward voltage drive level by electrically connecting the two single voltage AC LED circuits in parallel and a second forward voltage drive level by electrically connecting the at least two single voltage level AC LED circuits in series. The second forward voltage drive level of the serially connected AC LED circuits would be approximately twice the level of the first forward voltage drive level of the parallel connected AC LED circuits. The at least two parallel connected AC LED circuits would be twice the current of the at least two serially connected AC LED circuits. In either circuit configuration, the brightness would be approximately the same with either forward voltage drive selection of the multi-voltage LED device.

According to another aspect of the invention at least two single voltage LED circuits are formed on a single chip or on a substrate, and at least one bridge circuit made of LEDs is formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VAC, 24 VAC, 120 VAC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention at least two single voltage LED circuits are formed on a single chip or on a substrate, and at least one bridge circuit made of LEDs is formed on the same single chip or substrate providing a multi-voltage and/or multi-brightness LED device for direct DC power operation. Each single voltage LED circuit has at least two LEDs connected to each other in series. Each single voltage LED circuit is designed to be driven with a predetermined forward voltage and preferably matching forward voltages for each circuit such as 12 VDC, 24 VDC, 120 VDC, or other DC voltage levels for each single voltage LED circuit. Each multi-voltage and/or multi-brightness LED device would be able to be driven with at least two different DC forward voltages resulting in a first forward voltage drive level when the two single voltage LED circuits are connected in parallel and a second forward voltage drive level that is twice the level of the first forward voltage drive level when the at least two LED circuits are connected in series.

According to another aspect of the invention a multi-voltage and/or multi-current AC LED circuit is integrated within a single chip LED. Each multi-voltage and/or multi-current single chip AC LED LED comprises at least two single voltage AC LED circuits. Each single voltage AC LED circuit has at least two LEDs in anti-parallel configuration to accommodate direct AC voltage operation. Each single voltage AC LED circuit may have may have at least one voltage input electrical contact at each opposing end of the circuit or the at least two single voltage AC LED circuits may be electrically connected together in series on the single chip and have at least one voltage input electrical contact at each opposing end of the two series connected single voltage AC LED circuits and one voltage input electrical contact at the center junction of the at least two single voltage AC LED circuits connected in series. The at least two single voltage AC LED circuits are integrated within a single chip to form a multi-voltage and/or multi-current single chip AC LED.

According to another aspect of the invention, at least one multi-voltage and/or multi-brightness LED devices may be integrated within a LED lamp. The at least two individual LED circuits within the multi-voltage and/or multi-brightness LED device(s) may be wired in a series or parallel circuit configuration by the LED packager during the LED packaging process thus providing for at least two forward voltage drive options, for example 12 VAC and 24 VAC or 120 VAC and 240 VAC that can be selected by the LED packager.

According to another aspect of the invention a multi-voltage and/or multi-current AC LED package is provided, comprising at least one multi-voltage and/or multi-current single chip AC LED integrated within a LED package. The multi-voltage and/or multi-current AC LED package provides matching electrical connectivity pads on the exterior of the LED package to the electrical connectivity pads of the at least one multi-voltage and/or multi-current single chip AC LED integrated within the LED package thus allowing the LED package user to wire the multi-voltage and/or multi-current AC LED package into a series or parallel circuit configuration during the PCB assembly process or final product integration process and further providing a AC LED package with at least two forward voltage drive options.

According to another aspect of the invention multiple individual discrete LED chips are used to form at least one multi-voltage and/or multi-current AC LED circuit within a LED package thus providing a multi-voltage and/or multi current AC LED package. Each multi-voltage and/or multi-current AC LED circuit within the package comprises at least two single voltage AC LED circuits. Each single voltage AC LED circuit has at least two LEDs in anti-parallel configuration to accommodate direct AC voltage operation The LED package provides electrical connectivity pads on the exterior of the LED package that match the electrical connectivity pads of the at least two single voltage AC LED circuits integrated within the multi-voltage and/or multi-current AC LED package thus allowing the LED package to be wired into a series or parallel circuit configuration during the PCB assembly process and further providing a LED package with at least two forward voltage drive options.

According to another aspect of the invention a multi-voltage and/or multi-current single chip AC LED and/or multi-voltage and/or multi current AC LED package is integrated within an LED lamp. The LED lamp having a structure that comprises a heat sink, a lens cover and a standard lamp electrical base. The multi-voltage and/or multi-current single chip AC LED and/or package is configured to provide a means of switching on at least one additional single voltage AC LED circuit within multi-voltage and/or multi-current AC LED circuit to provide increased brightness from the LED lamp.

According to anther broad aspect of the invention at least one multi-current AC LED single chip is integrated within a LED package.

According to another aspect of the invention, at least one single chip multi-current LED bridge circuit is integrated within a LED lamp having a standard lamp base. The single chip multi-current LED bridge circuit may be electrically connected together in parallel configuration but left open to accommodate switching on a switch to the more than one on the single chip and have at least one accessible electrical contact at each opposing end of the two series connected circuits and one accessible electrical contact at the center junction of the at least two individual serially connected LED circuits. The at least two individual circuits are integrated within a single chip.

According to another aspect of the invention When the at least two circuits are left unconnected on the single chip and provide electrical pads for connectivity during the packaging process, the LED packager may wire them into series or parallel connection based on the desired voltage level specification of the end LED package product offering.

According to another broad aspect of the invention a multi-brightness single chip AC LED is provided having at least two LED circuits. Each LED circuit has at least two diodes connected to each other in opposing parallel relation, at least one of which such diodes is an LED thus forming an AC LED circuit that is integrated on a single chip. Each LED circuit within the multi-brightness single chip AC LED is designed to be driven in parallel with the same matching forward voltage such as 12 VAC, 24 VAC, 120 VAC, or other AC voltages level. Each multi-brightness single chip AC LED is designed to operate on at least one single circuit integrated within the multi-brightness single chip AC LED. The multi-brightness single chip AC LED operates on a switch having at least two positions each of which is connected to at least one circuit within the multi-brightness single chip AC LED.

It should be noted that "package" or "packaged" is defined herein as an integrated unit meant to be used as a discrete component in either of the manufacture, assembly, installation, or modification of an LED lighting device or system. Such a package includes LED's of desired characteristics with capacitors and or resistors sized relative to the specifications of the chosen opposing parallel LED's to which they will be connected in series and with respect to a predetermined AC voltage and frequency.

Preferred embodiments of a package may include an insulating substrate whereon the LEDs, capacitors and or resistors are formed or mounted. In such preferred embodiments of a package the substrate will include electrodes or leads for uniform connection of the package to a device or system associated with an AC driver or power source. The electrodes, leads, and uniform connection may include any currently known means including mechanical fit, and/or soldering. The substrate may be such as sapphire, silicon carbide, galium nitride, ceramics, printed circuit board material, or other materials for hosting circuit components.

A package in certain applications may preferably also include a heat sink, a reflective material, a lens for directing light, phosphor, nano-chrystals or other light changing or enhancing substances. In sum, according to one aspect of the invention, the LED circuits and AC drivers of the present invention permit pre-packaging of the LED portion of a lighting system to be used with standardized drivers of known specified voltage and frequency output. Such packages can be of varied make up and can be combined with each other to create desired systems given the scalable and compatible arrangements possible with, and resulting from, the invention.

According to one aspect of the invention, AC driven LED circuits (or "driven circuits") permit or enable lighting systems where LED circuits may be added to or subtracted (either by choice or by way of a failure of a diode) from the driven circuit without significantly affecting the pre-determined desired output range of light from any individual LED and, without the need to: (i) change the value of any discrete component; or, (ii) to add or subtract any discrete components, of any of the pre-existing driven circuit components which remain after the change. During design of a lighting system, one attribute of the LEDs chosen will be the amount of light provided during operation. In this context, it should be understood that depending on the operating parameters of the driver chosen, the stability or range of the voltage and frequency of the driver will vary from the nominal specification based upon various factors including but not limited to, the addition or subtraction of the LED circuits to which it becomes connected or disconnected. Accordingly, as sometimes referred to herein, drivers according to the invention are described as providing "relatively constant" or "fixed" voltage and frequency. The extent of this relative range may be considered in light of the acceptable range of light output desired from the resulting circuit at the before, during, or after a change has been made to the lighting system as a whole. Thus it will be expected that a pre-determined range of desired light output will be determined within which the driven LED circuits of the invention will perform whether or not additional or different LED circuits have been added or taken out of the driven circuit as a whole.

According to an aspect of the invention, an LED circuit driver provides a relatively fixed voltage and relatively fixed frequency AC output such as mains power sources. The LED circuit driver output voltage and frequency delivered to the LED circuit may be higher or lower than mains power voltage and frequencies by using an LED circuit inverter driver.

The higher frequency LED circuit inverter driver may be a electronic transformer, halogen or high intensity discharge (HID) lamp type driver with design modifications for providing a relatively fixed voltage as the LED circuit load changes. Meaning if the LED circuit inverter driver is designed to have an output voltage of 12V LED circuit driver would provide this output as a relatively constant output to a load having one or more than one LED circuits up to the wattage limit of the LED circuit driver even if LED circuits were added to or removed from the output of the LED circuit driver.

The higher frequency inverter having a relatively fixed voltage allows for smaller components to be used and provides a known output providing a standard reference High Frequency LED circuit driver.

Prior art for single chip LED circuits, for example those disclosed in 02004023568 and JP2004006582 do not provide a way to reduce the number of LEDs within the chip below the total forward voltage drop requirements of the source. The present invention however, enables an LED circuit to be made with any number of LEDs within a single chip, package or module by using capacitors or RC networks to reduce the number of LEDs needed to as few as one single LEO. Improved reliability, integration, product and system scalability and solid state lighting design simplicity may be realized with LED circuits and the LED circuit drivers. Individual LED circuits being the same or different colors, each requiring different forward voltages and currents may be driven from a single source LED circuit driver. Each individual LED circuit can self-regulate current by matching the capacitor or RC network value of the LED circuit to the known relatively fixed voltage and frequency of the LED circuit driver whether the LED circuit driver is a mains power source, a high frequency LED circuit driver or other LED circuit driver capable of providing a relatively fixed voltage and relatively fixed frequency output.

According to other aspects of the invention, the LED circuit driver may be coupled to a dimmer switch that regulates voltage or frequency or may have integrated circuitry that allows for adjustability of the otherwise relatively fixed voltage and/or relatively fixed frequency output of the LED circuit driver. The LED circuits get brighter as the voltage and/or frequency of the LED circuit driver output is increased to the LED circuits.

DETAILED DESCRIPTION OF PREFERRED EMBODIMENTS

Figure 1:
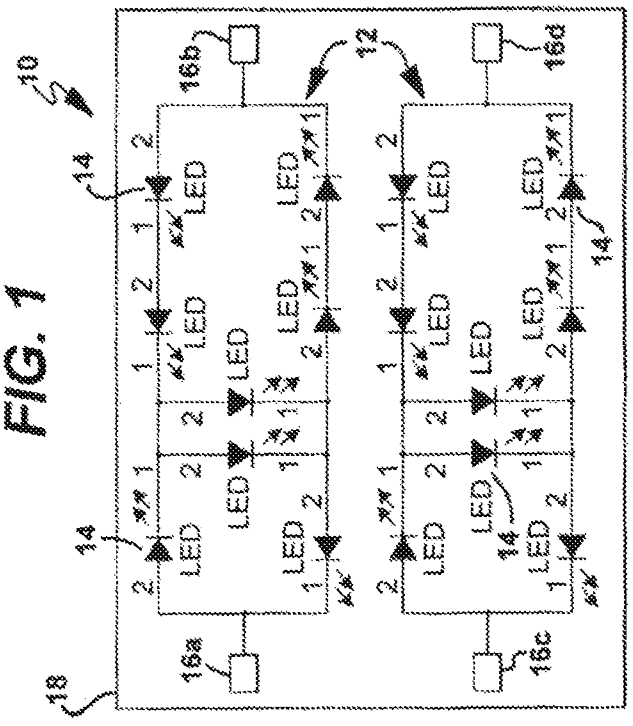
FIG. 1 shows a schematic view of a preferred embodiment of the invention.

FIG. 1 discloses a schematic diagram of a multi-voltage and/or multi-brightness LED lighting device 10. The multi-voltage and/or multi-brightness LED lighting device 10 comprises at least two AC LED circuits 12 configured in a imbalanced bridge circuit, each of which have at least two LEDs 14. The at least two AC LED circuits have electrical contacts 16*a*, 16*b*, 16*c*, and 16*d* at opposing ends to provide various connectivity options for an AC voltage source input. For example, if 16*a* and 16*c* are electrically connected together and 16*b* and 16*d* are electrically connected together and one side of the AC voltage input is applied to 16*a* and 16*c* and the other side of the AC voltage input is applied to 16*b* and 16*d*, the circuit becomes a parallel circuit with a first operating forward voltage. If only 16*a* and 16*c* are electrically connected and the AC voltage inputs are applied to electrical contacts 16*b* and 16*d*, a second operating forward voltage is required to drive the single chip 18. The single chip 18 may also be configured to operate at more than one brightness level "multi-brightness" by electrically connecting for example 16*a* and 16*b* and applying one side of the line of an AC voltage source to 16*a* ad 16*b* and individually applying the other side of the line from the AC voltage source a second voltage to 26*b* and 26*c*.

Figure 2:
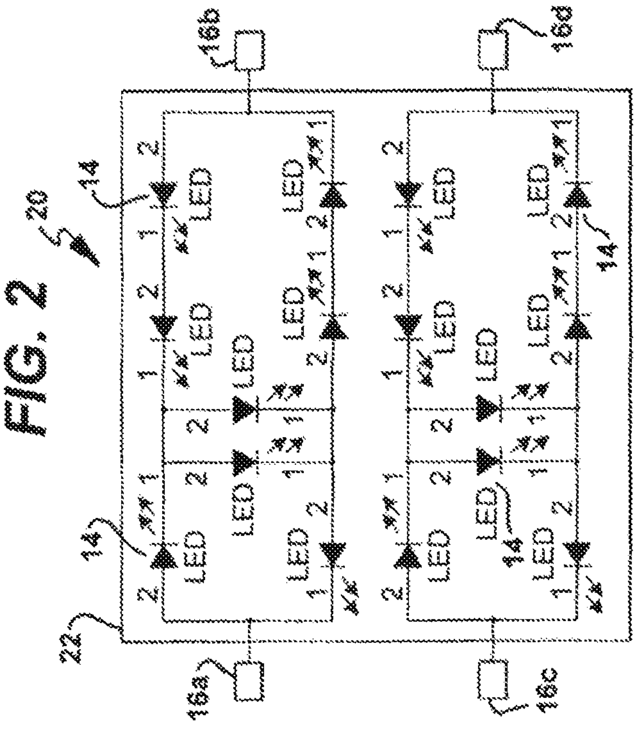
FIG. 2 shows a schematic view of a preferred embodiment of the invention.

FIG. 2 discloses a schematic diagram of a multi-voltage and/or multi-brightness LED lighting device 20 similar to the multi-voltage and/or multi-brightness LED lighting device 10 described above in FIG. 1. The at least two AC LED circuits 12 are integrated onto a substrate 22. The at least two AC LED circuits 12 configured in a imbalanced bridge circuit, each of which have at least two LEDs 14. The at least two AC LED circuits have electrical contacts 16*a*, 16*b*, 16*c*, and 16*d* on the exterior of the substrate 22 and can be used to electrically configure and/or control the operating voltage and/or brightness level of the multi-voltage and/or multi-brightness LED lighting device.

Figure 3:
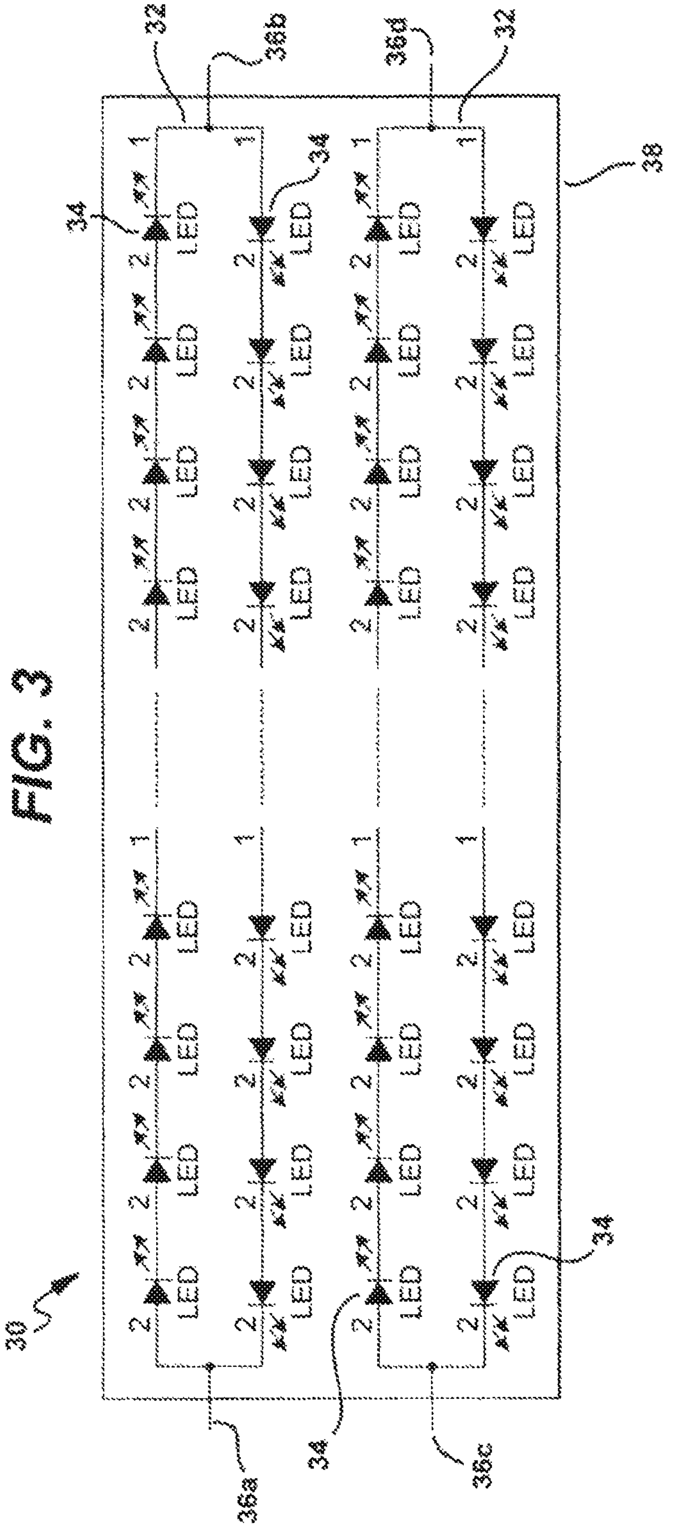
FIG. 3 shows a schematic view of a preferred embodiment of the invention.

FIG. 3 discloses a schematic diagram of a multi-voltage and/or multi-brightness LED lighting device 30 similar to the multi-voltage and/or multi-brightness LED lighting device 10 and 20 described in FIGS. 1 and 2. The multi-voltage and/or multi-brightness LED lighting device 30 comprises at least two AC LED circuits 32 having at least two LEDs 34 connected in series and anti-parallel configuration. The at least two AC LED circuits 32 have electrical contacts 36*a*, 36*b*, 36*c*, and 36*d* at opposing ends to provide various connectivity options for an AC voltage source input. For example, if 36*a* and 36*c* are electrically connected together and 36*b* and 36*d* are electrically connected together and one side of the AC voltage input is applied to 36*a* and 36*c* and the other side of the AC voltage input is applied to 36*b* and 36*d*, the circuit becomes a parallel circuit with a first operating forward voltage. If only 36*a* and 36*c* are electrically connected and the AC voltage inputs are applied to electrical contacts 36*b* and 36*d*, a second operating forward voltage is required to drive the multi-voltage and/or multi-brightness lighting device 30. The multi-voltage and/or multi-brightness lighting device 30 may be a monolithically integrated single chip 38, a monolithically integrated single chip integrated within a LED package 38 or a number of individual discrete die integrated onto a substrate 38 to form a multi-voltage and/or multi-brightness lighting device 30.

Figure 4:
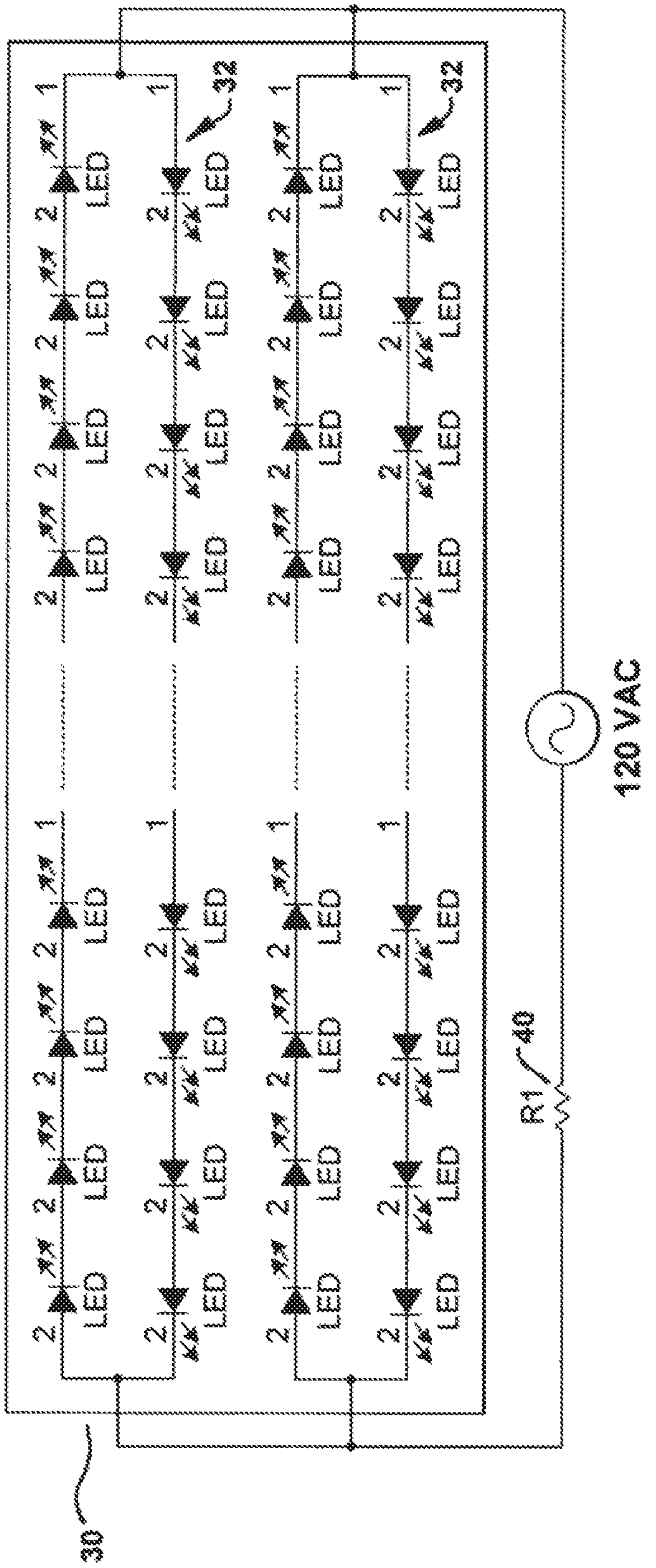
FIG. 4 shows a schematic view of a preferred embodiment of the invention.

FIG. 4 discloses a schematic diagram of the same multi-voltage and/or multi-brightness LED device 30 as described in FIG. 3 having the at least two AC LED circuits 32 connected in parallel configuration to an AC voltage source and operating at a first forward voltage. A resistor 40 may be used to limit current to the multi-voltage and/or multi-brightness LED lighting device 30.

Figure 5:
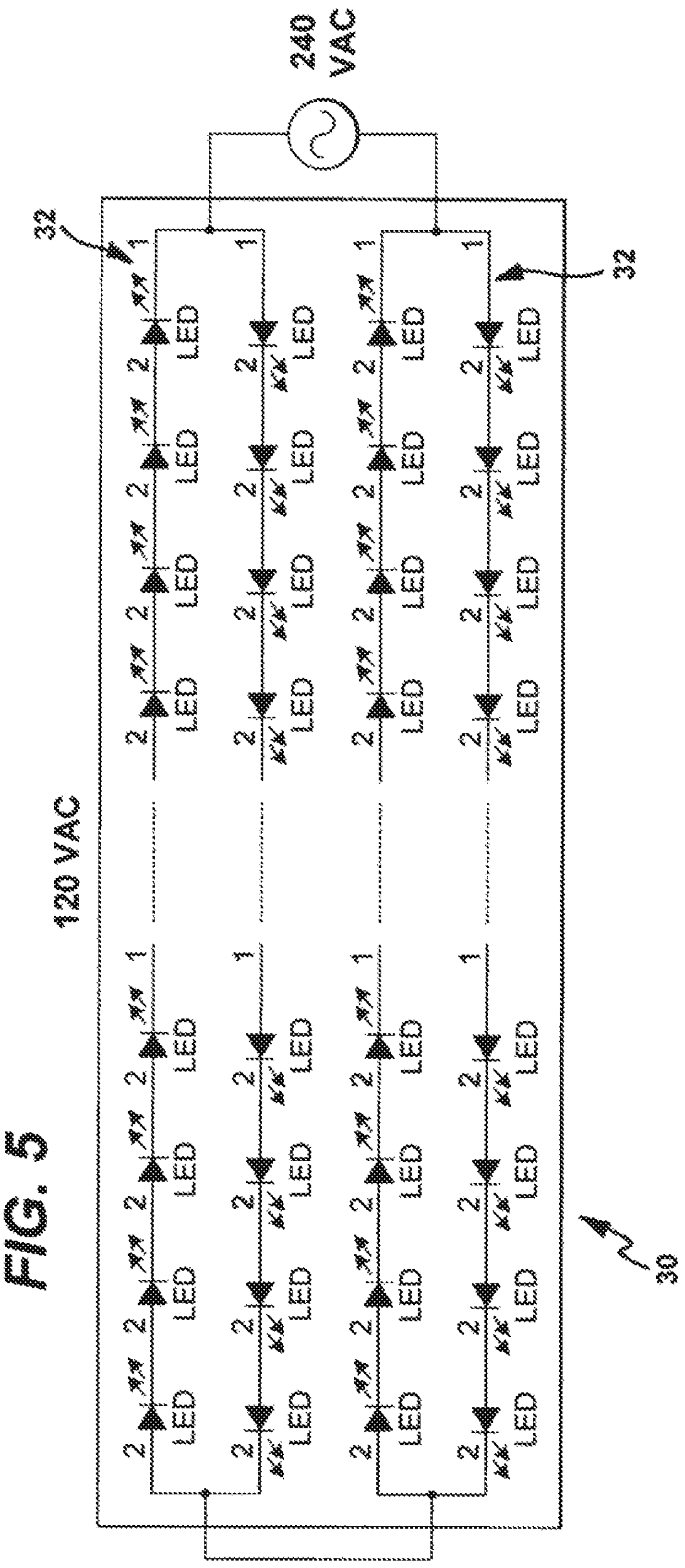
FIG. 5 shows a schematic view of a preferred embodiment of the invention.

FIG. 5 discloses a schematic diagram of the same multi-voltage and/or multi-brightness LED device 30 as described in FIG. 3 having the at least two AC LED circuits 32 connected in series configuration to an AC voltage source and operating at a second forward voltage that is approximately two times greater than the first forward voltage of the parallel circuit as described in FIG. 4. A resistor may be used to limit current to the multi-voltage and/or multi-brightness LED lighting device.

Figure 6:
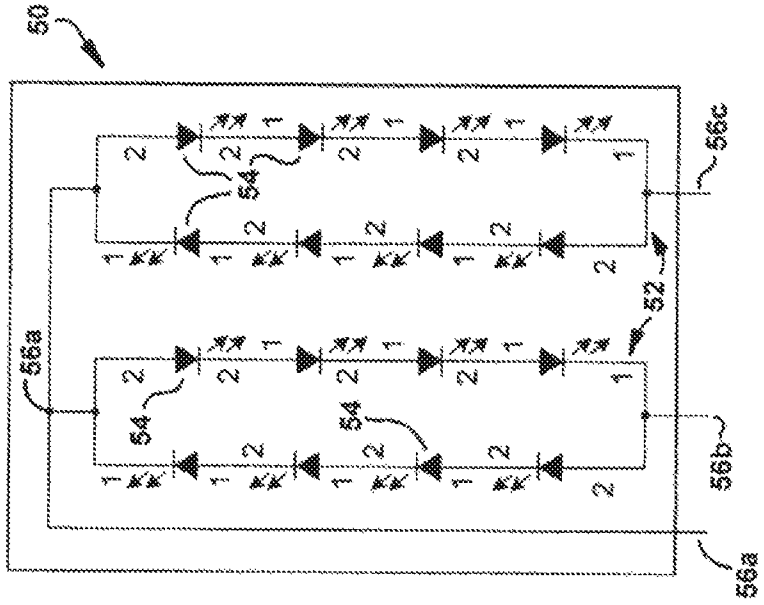
FIG. 6 shows a schematic view of a preferred embodiment of the invention.

FIG. 6 discloses a schematic diagram of a multi-voltage and/or multi-brightness LED lighting device 50. The multi-voltage and/or multi-brightness LED lighting device 50 comprises at least two AC LED circuits 52, each of which have at least two LEDs 54 in series and anti-parallel relation. The at least two AC LED circuits 52 have at least three electrical contacts 56*a*, 56*b* and 56*c*. The at least two AC LED circuits 52 are electrically connected together in parallel at one end 56*a* and left unconnected at the opposing ends of the electrical contacts 56*b* and 56*c*. One side of an AC voltage source line is electrically connected to 56*a* and the other side of an AC voltage source line is individually electrically connected to 56*b* and 56*c* with either a fixed connection or a switched connection thereby providing a first brightness when AC voltage is applied to 56*a* and 56*b* and a second brightness when an AC voltage is applied to 56*a*, 56*b* and 56*c*. It is contemplated that the multi-voltage and/or multi-brightness LED lighting device 50 is a single chip, an LED package, an LED assembly or an LED lamp. The multi-brightness switching capability.

Figure 7:
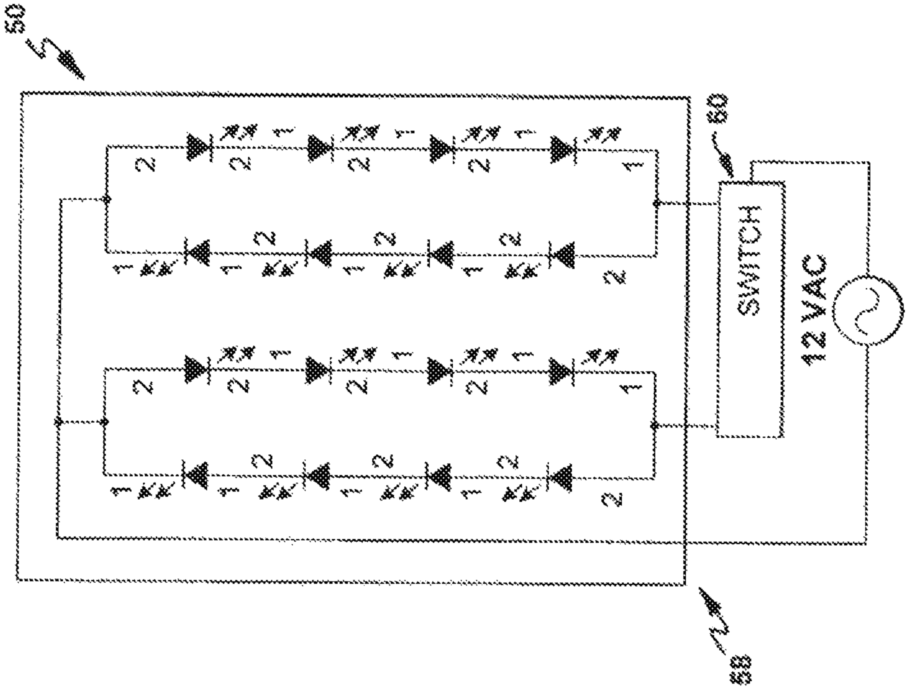
FIG. 7 shows a schematic view of a preferred embodiment of the invention.

FIG. 7 discloses a schematic diagram similar to the multi-voltage and/or multi-brightness LED device 50 shown in FIG. 6 integrated within a lamp 58 and connected to a switch 60 to control the brightness level of the multi-voltage and/or multi-brightness LED lighting device 50.

Figure 8:
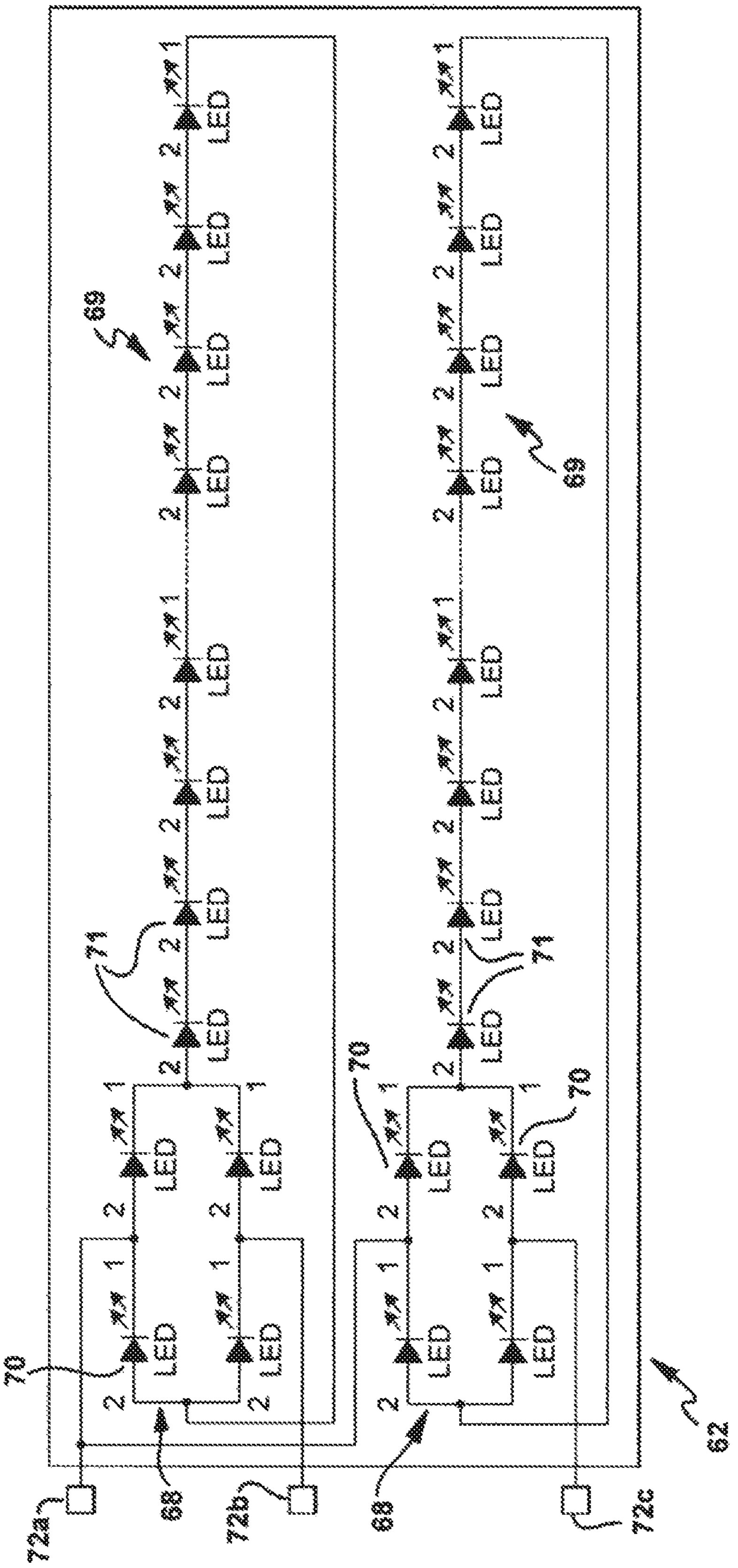
FIG. 8 shows a schematic view of a preferred embodiment of the invention.

FIG. 8 discloses a schematic diagram a multi-brightness LED lighting device 62 having at least two bridge rectified 68 series LED circuits 69. Each of the at least two bridge rectified 68 series LED circuits 69 that are connected to and rectified with an LED bridge circuit 68 comprising four LEDs 70 configured in a bridge circuit 68. The at least two bridge rectified 68 series LED circuits 69 have at least two LEDs 71 connected in series and electrical contacts 72*a*, 72*b* and 72*c*. When one side of an AC voltage is applied to 72*a* and the other side of an AC voltage line is applied to 72*b* and 72*c* individually, the brightness level of the multi-brightness LED lighting device 62 can be increased and/or decreased I a fixed manner or a switching process.

Figure 9:
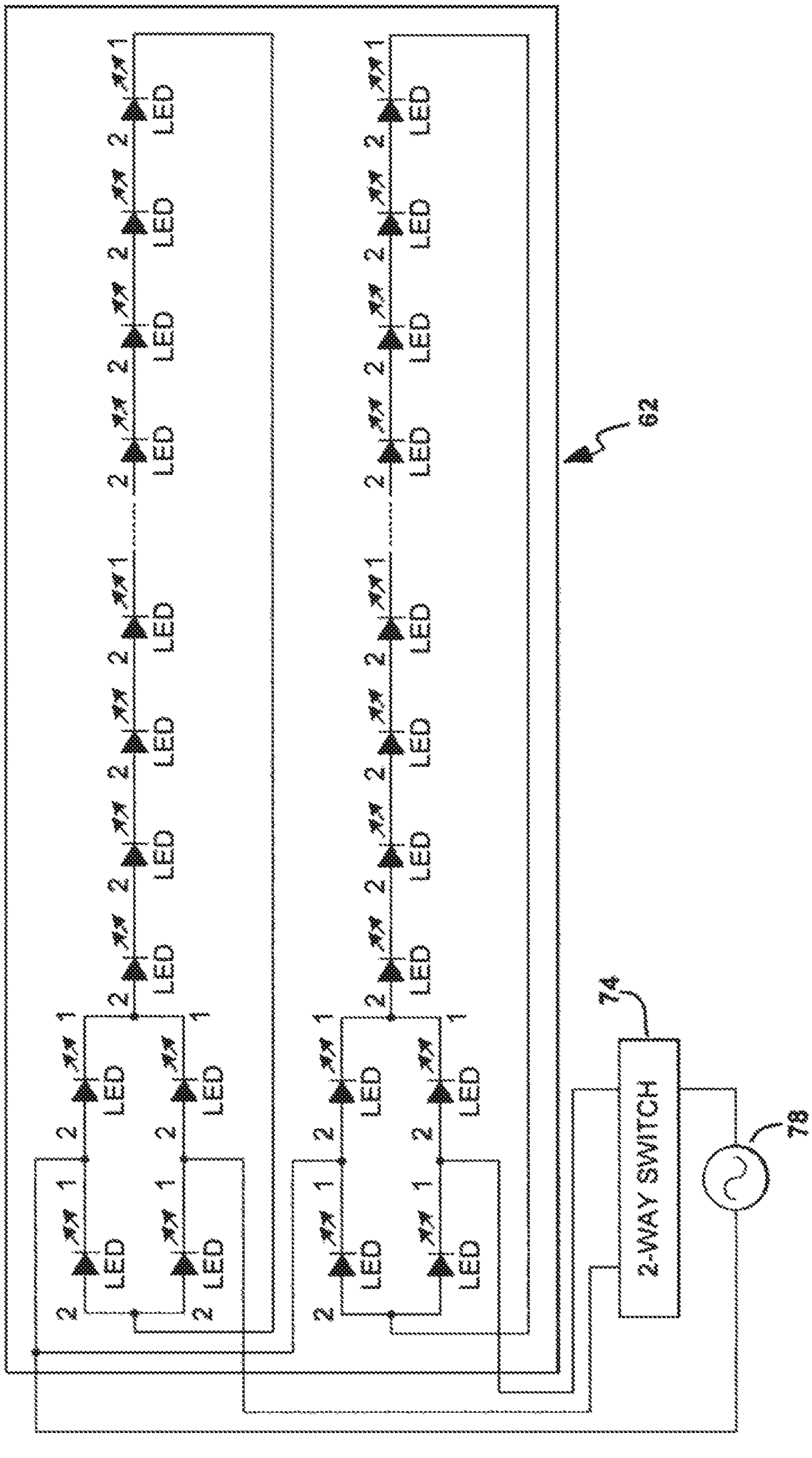
FIG. 9 shows a schematic view of a preferred embodiment of the invention.

FIG. 9 discloses a schematic diagram the multi-brightness LED lighting device 62 as shown above in FIG. 8 with a switch 74 electrically connected between the multi-brightness LED lighting device 62 and the AC voltage source 78.

FIG. 9 discloses a schematic diagram of at least two single voltage LED circuits integrated with a single chip or within a substrate and forming a multi-voltage and/or multi-brightness LED device.

Figure 10:
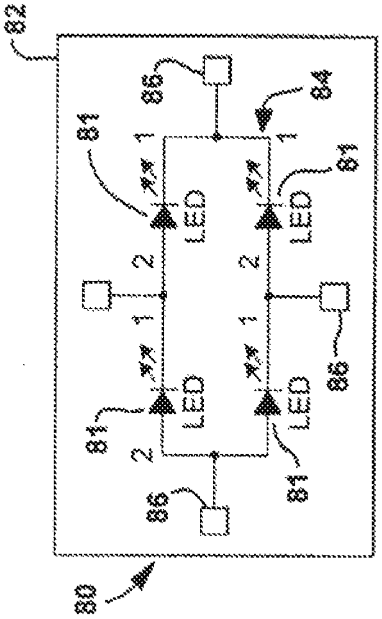
FIG. 10 shows a schematic view of a preferred embodiment of the invention.

FIG. 10 discloses a schematic diagram of a single chip LED bridge circuit 80 having four LEDs 81 configured into a bridge circuit and monolithically integrated on a substrate 82. The full wave LED bridge circuit has electrical contacts 86 to provide for AC voltage input connectivity and DC voltage output connectivity.

Figure 11:
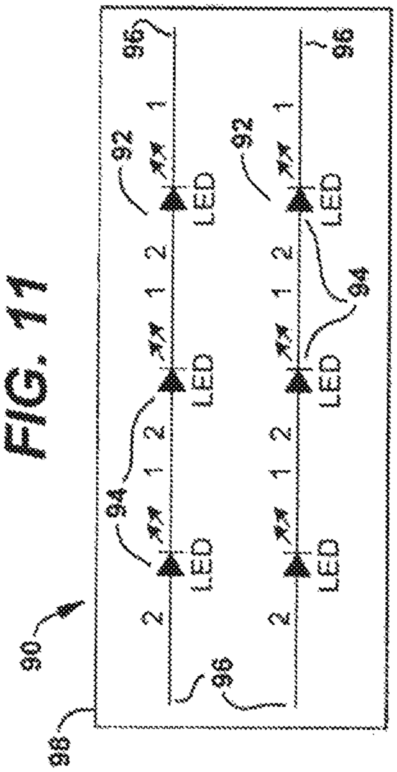
FIG. 11 shows a schematic view of a preferred embodiment of the invention; and, FIG. 12 shows a schematic view of a preferred embodiment of the invention.

FIG. 11 discloses a schematic diagram of another embodiment of a single chip multi-voltage and/or multi-brightness LED lighting device 90. The multi-voltage and/or multi-brightness LED lighting device 90 has at least two series LED circuits 92 each of which have at least two LEDs 94 connected in series. The at least two series LED circuits 92 have electrical contacts 96 at opposing ends to provide a means of electrical connectivity. The at least two series LED circuits are monolithically integrated into a single chip 98. The electrical contacts 96 are used to wire the at least two series LEDs circuit 92 into a series circuit, a parallel circuit or an AC LED circuit all within a single chip.

Figure 12:
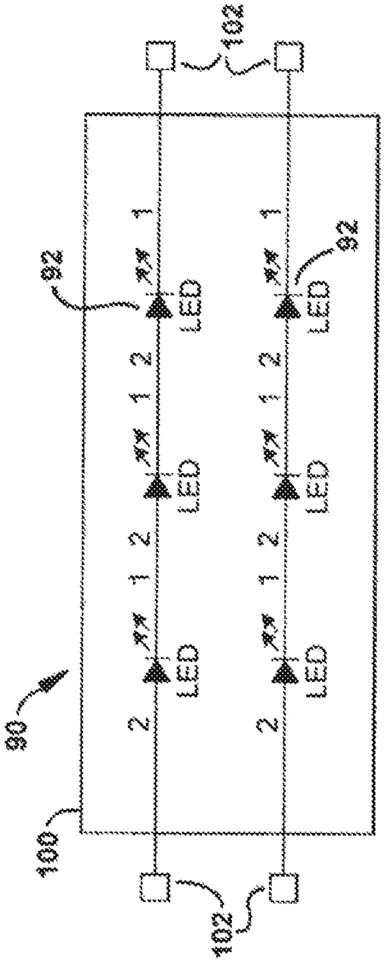

FIG. 12 discloses a schematic diagram of the same multi-voltage and/or multi-brightness LED lighting device 90 as shown above in FIG. 11. The multi-voltage and/or multi-brightness LED lighting device 90 has at least two series LED circuits 92 each of which have at least two LEDs 94 connected in series. The at least two series LED circuits can be monolithically integrated within a single chip or discrete individual die can be integrated within a substrate to form an LED package 100. The LED package 100 has electrical contacts 102 that are used to wire the at least two series LEDs circuit into a series circuit, a parallel circuit or in anti-parallel to form an AC LED circuit all within a single LED package.

The invention is claimed as follows:

1. An LED lighting device comprising:

a first LED circuit having at least two phosphor coated LEDs connected in series;

at least one additional LED circuit having at least two phosphor coated LEDs connected in series, wherein providing power to the first LED circuit and the at least one additional LED circuit with different DC voltage levels causes the first LED circuit to emit a different level of brightness than the at least one additional LED circuit, and wherein the first LED circuit is configured to emit a different color of light than the at least one additional LED circuit when the first LED circuit and the at least one additional LED circuit are provided with the different DC voltage levels; and a switch having user selectable positions for providing user control to select DC voltage level options to change the DC voltage level that is delivered to at least one of the first LED circuit and the at least one additional LED circuit for:

(a) decreasing the brightness level individually of the first LED circuit or the at least one additional LED circuit by decreasing the DC voltage level, and (b) individually electrically disconnecting the first LED circuit or the at least one additional LED circuit from a DC voltage power source, wherein the LED lighting device is configured to be connected to and powered by a mains power source.

2. The LED lighting device of claim 1, wherein the switch has at least three positions to provide user control, wherein at least one of the three user control positions increases the brightness level of at least one of the first LED circuit or the at least one additional LED circuit when the user switches the switch.

3. The LED lighting device of claim 1, wherein at least one of the user selectable positions increases the level of DC voltage or current provided to one of the first LED circuit or the at least one additional LED circuit when the user switches the switch to the position.

4. The LED lighting device of claim 1, wherein switching of the switch provides at least two different levels of DC voltage or current via at least one of a driver integrated circuit or at least one resistor to at least one of the first LED circuit or the at least one additional LED circuit.

5. The LED lighting device of claim 4, wherein the driver integrated circuit, the at least one resistor, the first LED circuit, and the at least one additional LED circuit are mounted on a PCB substrate that comprises a reflective material.

6. The LED lighting device of claim 1, further comprising a lighting device packaged assembly including a heat sink having a reflective material and a lens, wherein the LED lighting device is integrated into the lighting device packaged assembly.

7. The LED lighting device of claim 1, wherein at least one of the user selectable positions of the switch increases the brightness of the first LED circuit and decreases the brightness of the at least one additional LED circuit.

8. An LED lighting device comprising:

a first LED circuit having at least two LEDs;

at least one additional LED circuit connected in parallel to the first LED circuit, wherein the first LED circuit is configured to emit a different color of light than the at least one additional LED circuit, wherein the first LED circuit and the at least one additional LED circuit each includes at least two phosphor coated LEDs connected in series, and wherein the phosphor coated LEDs in the first LED circuit emit a different color of light than the phosphor coated LEDs in the at least one additional LED circuit; and a switch having at least three selectable positions for providing user control to select DC voltage level options to change a DC voltage level that is delivered to the first LED circuit and the at least one additional LED circuit, at least one of the switch positions causing a decrease in a brightness level of light emitted from the first LED circuit or the at least one additional LED circuit, and another one of the switch positions individually electrically disconnecting the first LED circuit or the at least one additional LED circuit from a mains power source, wherein decreasing the brightness level of at least one of the first LED circuit or the at least one additional LED circuit causes a change in the color of light that is emitted from the LED lighting device, wherein the switch selectable positions are selectable by a user switching the positions of the switch, and wherein the LED lighting device is configured to be connected to and powered by the mains power source.

9. The LED lighting device of claim 8, wherein at least one of the at least three selectable positions increases the brightness level of at least one of the first LED circuit or the at least one additional LED circuit when the user switches the switch.

10. The LED lighting device of claim 8, wherein switching of the switch provides one of at least two different levels of DC voltage or current via at least one of a driver integrated circuit or at least one resistor to at least one of the first LED circuit or the at least one additional LED circuit.

11. The LED lighting device of claim 8, wherein the switch, the first LED circuit, and the at least one additional LED circuit are integrated into a packaged product of the LED lighting device, the packaged product including a heat sink having a reflective material and a lens cover.

12. The LED lighting device of claim 11, wherein the switch, the first LED circuit, and the at least one additional LED circuit are mounted to a PCB substrate having a reflective material.

13. The LED lighting device of claim 8, further comprising a lighting device packaged assembly including a heat sink having a reflective material and a lens, wherein the LED lighting device is integrated into the lighting device packaged assembly.

14. The LED lighting device of claim 8, wherein at least one of the switch positions selected by the user increases the brightness of the first LED circuit and decreases the brightness of the at least one additional LED circuit.

15. An LED lighting device comprising:

a first LED circuit;

at least one additional LED circuit connected in parallel to the first LED circuit, wherein the first LED circuit and the at least one additional LED circuit each includes at least two phosphor coated LEDs connected in series, and wherein the phosphor coated LEDs in the first LED circuit emit a different color of light than the phosphor coated LEDs in the at least one additional LED circuit; and a switch having selectable positions for providing user control to select DC voltage level options to change a DC voltage level that is delivered to the first LED circuit and the at least one additional LED circuit, the switch providing a means for:

(a) switching the DC voltage level input to the first LED circuit or the at least one additional LED circuit to produce a change in brightness of at least one of the first LED circuit or the at least one additional LED circuit, and (b) switching electrically on or off at least one of the first LED circuit or the at least one additional LED circuit, wherein the switch selectable positions for (a) and (b) are selectable by a user switching the switch, and wherein the LED lighting device is configured to be connected to and powered by a mains power source.

16. The LED lighting device of claim 15, wherein the switch has at least three user selectable positions, wherein at least one of the three user selectable positions increases the brightness level of at least one of the first LED circuit or the at least one additional LED circuit when the user switches the switch.

17. The LED lighting device of claim 15, wherein the switching of the switch provides at least two different levels of DC voltage or current via at least one of a driver integrated circuit or at least one resistor to at least one of the first LED circuit or the at least one additional LED circuit.

18. The LED lighting device of claim 15, wherein the switch, the first LED circuit, and the at least one additional LED circuit are mounted on a PCB substrate that comprises a reflective material.

19. The LED lighting device of claim 15, further comprising a lighting device packaged assembly including a heat sink having a reflective material and a lens, wherein the LED lighting device is integrated into the lighting device packaged assembly.

20. The LED lighting device of claim 15, wherein the switch has at least three selectable positions, and wherein at least one of the positions selected by the user increases the brightness of the first LED circuit and decreases the brightness of the at least one additional LED circuit.

21. An LED lighting device comprising an LED driver having an AC mains voltage input and a lower voltage DC output connected to:

a first LED circuit having at least two phosphor coated LEDs connected in series, at least one additional circuit having at least two phosphor coated LED connected in series that emit a different color of light than the LEDs in the first LED circuit, and a switch having user selectable positions for selecting different levels of DC voltage or current to be provided in response to a user switching the switch and selecting between which of a first LED circuit having the at least two phosphor coated LEDs connected in series and the at least one additional LED circuit having the at least two phosphor coated LEDs connected in series receives a lower level of DC voltage or current than the other LED circuit to cause the LED lighting device to emit a first color of light when the first LED circuit receives the lower level of DC voltage or current and at least a second color of light when the at least one additional LED circuit receives the lower level of DC voltage or current.

22. The LED lighting device of claim 21, wherein the switch has at least three user selectable positions, wherein at least one of the three user selectable positions increases the level of DC voltage or current provided to one of the first LED circuit or the at least one additional LED circuit when the user switches the switch to the position.

23. The LED lighting device of claim 21, wherein switching of the switch provides at least two different levels of DC voltage or current via at least one of a driver integrated circuit and at least one resistor to at least one of the first LED circuit or the at least one additional LED circuit.

24. The LED lighting device of claim 23, wherein the driver integrated circuit, the at least one resistor, the first LED circuit, and the at least one additional LED circuit are mounted on a PCB substrate that comprises a reflective material.

25. The LED lighting device of claim 24, wherein the PCB substrate is integrated into a lighting device packaged assembly comprising a heat sinking reflective material and a lens.

26. The LED lighting device of claim 21, further comprising a lighting device packaged assembly including a heat sink having a reflective material and a lens, wherein the LED lighting device is integrated into the lighting device packaged assembly.

27. The LED lighting device of claim 21, wherein the switch has at least three selectable positions, and wherein at least one of the positions selected by the user increases a brightness of the first LED circuit and decreases a brightness of the at least one additional LED circuit.

28. An LED lighting device comprising:

a first LED circuit having at least two phosphor coated LEDs;

at least one additional LED circuit having at least two phosphor coated LEDs, wherein the first LED circuit and the at least one additional LED circuit are powered by a DC voltage source, wherein the first LED circuit is configured to emit a different color of light than the at least one additional LED circuit, wherein the first LED circuit and the at least one additional LED circuit each includes at least two phosphor coated LEDs connected in series, and wherein the phosphor coated LEDs in the first LED circuit emit a different color of light than the phosphor coated LEDs in the at least one additional LED circuit; and a switch having selectable positions for providing user control to select DC voltage level options to change a DC voltage level that is delivered to the first LED circuit and the at least one additional LED circuit, the switch providing a means for:

(a) decreasing a brightness level individually of the first LED circuit or the at least one additional LED circuit, and (b) selectively electrically disconnecting the first LED circuit or the at least one additional LED circuit from the DC voltage source, wherein the switch selectable positions are selectable by a user switching the positions of the switch, and wherein the LED lighting device is configured to be connected to and powered by a mains power source.

29. An LED lighting device comprising:

a first LED circuit;

at least one additional LED circuit connected in parallel to the first LED circuit, wherein the first LED circuit is configured to emit a different color of light than the at least one additional LED circuit, wherein the first LED circuit and the at least one additional LED circuit each includes at least two phosphor coated LEDs connected in series, and wherein the phosphor coated LEDs in the first LED circuit emit a different color of light than the phosphor coated LEDs in the at least one additional LED circuit;

a switch having selectable positions for individually providing one of at least two levels of DC voltage or current to the first LED circuit and the at least one additional LED circuit, wherein at least one of the at least two levels of DC voltage or current decreases a brightness level of the first LED circuit or the at least one additional LED circuits, and wherein decreasing the brightness level of at least one of the first LED circuit or the at least one additional LED circuit causes a change in the color of light that emits from the LED lighting device, and wherein the switch selectable positions are selectable by a user switching the positions of the switch;

a PCB assembly, wherein the first LED circuit and the at least one additional LED circuit are mounted to the PCB assembly; and a heat sinking lighting device package, wherein the PCB assembly is integrated into the lighting device package, wherein the lighting device package includes a reflective material, a lens, wire leads for electrical connection of the lighting device package to an AC mains voltage power source, and wherein the lighting device package is configured for mechanical fit and connection to a device associated with a lighting system.

30. The LED lighting device of claim 29, wherein switching of the switch provides at least two different levels of DC voltage or current via at least one of a driver integrated circuit or at least one resistor to at least one of the first LED circuit or the at least one additional LED circuit.

* * * * *